(12) United States Patent
Sumida et al.

(10) Patent No.: US 7,527,315 B2
(45) Date of Patent: May 5, 2009

(54) SEAT DEVICE FOR VEHICLE

(75) Inventors: Kazue Sumida, Hiroshima (JP); Minoru Toyota, Hiroshima (JP); Naomune Moriyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 48 days.

(21) Appl. No.: 11/709,201

(22) Filed: Feb. 22, 2007

(65) Prior Publication Data

US 2007/0216186 A1 Sep. 20, 2007

(30) Foreign Application Priority Data

| Mar. 3, 2006 | (JP) | ............................ 2006-057694 |
| Mar. 3, 2006 | (JP) | ............................ 2006-057695 |
| Mar. 7, 2006 | (JP) | ............................ 2006-060410 |

(51) Int. Cl.
*B60N 3/12* (2006.01)
*A47C 7/62* (2006.01)

(52) U.S. Cl. ..................... 296/69; 296/65.01; 296/37.8; 297/188.08; 297/188.09; 297/188.04

(58) Field of Classification Search ................. 296/63, 296/64, 65.01, 66, 65.05, 65.08, 69, 37.8, 296/24.34, 37.15; 297/188.08, 188.09, 188.1, 297/188.04, 188.05, 188.21
See application file for complete search history.

(56) References Cited

U.S. PATENT DOCUMENTS

| 5,658,043 A | * | 8/1997 | Davidson | ..................... 297/113 |
| 5,848,820 A | * | 12/1998 | Hecht et al. | ............... 297/188.1 |
| 2007/0085363 A1 | * | 4/2007 | Sturt et al. | .................. 296/37.8 |

FOREIGN PATENT DOCUMENTS

| DE | 10161422 | 6/2003 |
| EP | 1582398 | 10/2005 |
| GB | 2412849 | 10/2005 |
| JP | 07-112648 | 5/1995 |
| JP | 7112648 | 5/1995 |
| JP | 10-100747 | 4/1998 |

OTHER PUBLICATIONS

European Search Report Application EP 07003429 dated Aug. 22, 2007.

* cited by examiner

*Primary Examiner*—Joseph D Pape
(74) *Attorney, Agent, or Firm*—Studebaker & Brackett PC; Donald R. Studebaker

(57) ABSTRACT

A armrest portion moving forward away from seat backs for allowing an object to be placed thereon is provided at the central portion of the seat backs of a rear row seat, and a movable cushion provided at a central portion of seat cushions in the vehicle width direction. The movable cushion is operative to move upward and forward away from the seat cushions to the location near a front end of the armrest portion. Accordingly, a large-scaled console can be formed at the proper level with the armrest portion and the movable cushion, thereby improving convenience.

14 Claims, 27 Drawing Sheets

SEAT DEVICE FOR VEHICLE

BACKGROUND OF THE INVENTION

The present invention relates to a seat device for a vehicle that comprises a rear row seat including a seat cushion forming a sitting face for a passenger and a seat back standing upward from a rear end portion of the seat cushion and forming a leaning back face for the passenger.

The above-described seat device for a vehicle is disclosed in some patent publications. Japanese Patent Laid-Open Publication No. 10-100747 discloses a seat device for a vehicle, in which there is provided a front row seat on a floor panel that includes a driver's seat and an assistant's seat that are disposed side by side, a pair of rear seats (rear row seat) is provided behind the front row seat, on a central portion of the floor panel is provided a pair of rails for a center seat slide that extends in a longitudinal direction of the vehicle, and a center seat including a seat cushion, a lower seat back and an upper seat back is further provided, wherein the center seat is configured to be located between the seats of the front row seat or between the seats of the rear row seat.

According to the above-described conventional structure, the upper seat back may be properly used as an armrest or a table when the center seat is located between the seats. However, the center seat itself is configured to move along the rails, so it would be impossible to form a large-scaled console. Also, a pair of rails is provided on the floor panel so as to move the center seat itself longitudinally, so the structure would become complex improperly.

Japanese Patent Laid-Open Publication No. 7-112648 discloses a seat device for a vehicle, in which a console lid is provided at a floor console box so to be opened or closed, and the console lid is located so as to interconnect the floor console box and a center portion of a seat cushion of a rear seat when it moves to its rearward use-state position, thereby forming a longitudinally-extending continuous console.

According to this structure, however, it may be impossible that the above-described console with the floor console box and console lid is formed at a specified proper level, so the center portion of the seat cushion of the rear seat would not be utilized properly.

SUMMARY OF THE INVENTION

An object of the present invention is to provide a seat device for a vehicle that can form a large-scaled console (storage space) at a proper level with an armrest portion and a movable cushion portion, thereby improving convenience.

According to the present invention, there is provided a seat device for a vehicle, comprising a seat cushion and a seat back of a rear row seat, the seat cushion forming a sitting face for a passenger, the seat back standing upward from a rear end portion of the seat cushion and forming a leaning back face for the passenger, an armrest portion provided at a central portion of the seat back of the rear row seat, the armrest portion being operative to move forward away from the seat back for allowing an object to be placed thereon, and a movable cushion portion provided at a central portion of the seat cushion in a vehicle width direction, the movable cushion portion being operative to move upward and forward away from the seat cushion to a location near a front end of the armrest portion.

According to the above-described structure, since the movable cushion portion moves upward and forward away from the seat cushion to the location near the front end of the armrest portion, a large-scaled console (storage space) can be formed at a proper level with the armrest portion and the movable cushion portion, thereby improving convenience.

According to an embodiment of the present invention, the armrest portion and movable cushion portion are configured so as to form a console portion therewith having a substantially continuous upper face. Thereby, since the continuously flat console can be formed, the convenience can be further improved.

According to another embodiment of the present invention, the seat back of the rear row seat comprises a pair of seat backs that are provided independently from each other in the vehicle width direction, the armrest portion is provided between the pair of the seat backs, and the armrest portion is operative to form a center seat back in a normal state thereof. Thereby, in case of a normal state where the armrest portion is used as a center seat back, three passengers can sit in the rear seat. While, in the case where the armrest portion is used as an armrest, a pair of personal seats can be provided such that two passengers can sit independently in the rear seat. Namely, two types of rear seat for two passengers and three passengers are available at needs, and the armrest portion only for passengers in the rear seat can be provided in the case where the armrest portion is used as the armrest. Thus, the passengers can be provided with a comfortable sitting.

According to another embodiment of the present invention, a front row seat comprising a driver's seat and an assistant's seat is provided in front of the rear row seat, and an armrest portion for front seat is provided between the driver's seat and the assistant's seat. Thereby, many passengers sitting can be provided with the front and rear row seats. Further, when a small number of passengers sit, the movable cushion portion of the rear row seat is moved upward and forward, there can be further larger console portion with the armrest portion for front seat, movable cushion portion and armrest portion for rear seat. Accordingly, the convenience can be further improved.

According to another embodiment of the present invention, the movable cushion portion is positioned substantially at a continuously close level to the armrest portion for front seat when the movable cushion portion moves. Thereby, the armrest portion for front seat, movable cushion portion and armrest portion for rear seat are made flat, so the convenience can be further improved.

According to another embodiment of the present invention, the seat back of the rear row seat is forward foldable such that a flat baggage compartment is formed thereon. Thereby, a properly flat and large baggage compartment can be formed when the seat back of the rear row seat is forward folded.

According to another embodiment of the present invention, the armrest portion for front seat is supported at a floor console portion, which is provided on a floor panel between the driver's seat and the assistant's seat, independently from both the seats. Thereby, even if the driver's seat and/or the assistant's seat slide in the longitudinal direction, a position of the armrest portion for front seat can be ensured, ensuring a support rigidity of the armrest portion for front seat, and the association of the movable cushion portion with the armrest portion for front seat can be properly maintained.

According to another embodiment of the present invention, at least one of the seat backs of the rear row seat is configured to move in a longitudinal direction, the armrest portion for rear seat is attached to either one of the seat backs of the rear row seat. Thereby, a space of the baggage compartment and the passenger compartment can be properly adjusted by moving the rear row seat longitudinally, forming the large-scaled console at the proper level with the movable cushion portion and the armrest portion for front seat.

According to another embodiment of the present invention, the seat cushion of the rear row seat comprises a pair of seat cushions that are provided independently from each other in the vehicle width direction, the movable cushion portion is provided between the pair of the seat cushions, a cushion moving mechanism to move the movable cushion portion upward and forward is provided. Thereby, a layout for many passengers sitting can be provided with the front and rear row seats. Also, in the case where a small number of passengers sit in the vehicle, the movable cushion portion provided between the pair of the seat cushions of the rear row seat is moved forward and upward by the cushion moving mechanism such that the movable cushion portion is located at the proper level. Accordingly, the movable cushion portion can be used as a properly convenient console. Namely, compatibility of the layout in case of many passengers and the convenient console forming in case of the small number of passengers can be attained.

According to another embodiment of the present invention, a storage portion for an object, which is covered with a lid member that can be opened and closed, is provided at the movable cushion portion. Thereby, the movable cushion portion can be properly used as the object storage.

According to another embodiment of the present invention, the cushion moving mechanism comprises a link mechanism having a pair of links that are provided longitudinally. Thereby, the cushion moving mechanism can be materialized with a simple structure.

According to another embodiment of the present invention, at least one ends of the pair of links are connected to a floor panel and the other ends are connected to the movable cushion portion. Herein, the above-described floor panel to which the one ends of the links are connected may be configured to be a kick-up floor portion of the floor panel. Since the links are connected to the floor panel at their one ends, a properly-high support rigidity can be provided to the link mechanism and movable cushion portion.

According to another embodiment of the present invention, one of the pair of links is located in a recess portion of the floor panel. Thereby, one of the pair of links can be stored properly by utilizing a space formed at the floor panel.

Other features, aspects, and advantages of the present invention will become apparent from the following description that refers to the accompanying drawings.

DETAILED DESCRIPTION OF THE INVENTION

Figure 1:
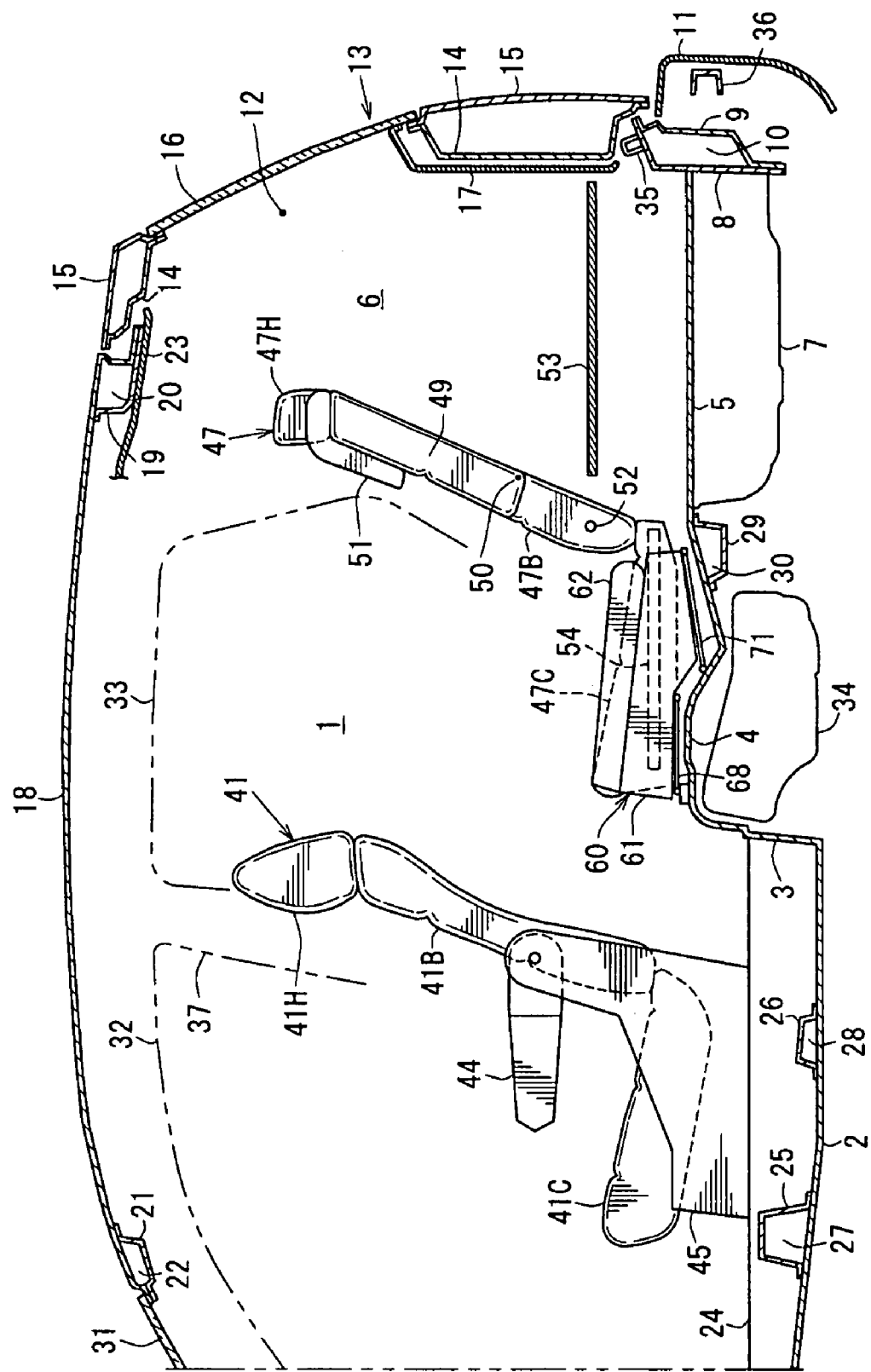
FIG. 1 is a side view of a vehicle equipped with a seat device for a vehicle according to the present invention.

Hereinafter, preferred embodiments of the present invention will be described referring to the accompanying drawings. Figures show a seat device for a vehicle. First, a vehicle body structure will be described referring to FIG. 1. A floor panel 2 forming a floor face of a vehicle compartment 1 is provided, and a vertical wall portion 3 of a kick-up portion that rises upward from the floor panel 2 and a kick-up floor portion 4 that extends rearward from the vertical wall portion 3 are formed at a rear portion of the floor panel 2.

At a further rearward-located portion behind the kick-up floor portion 4 is formed a baggage-compartment floor 5 that extends rearward horizontally. A rear baggage compartment 6 is provided above the baggage-compartment floor 5. A recessed spare tire pan 7 for storing a spare tire is formed at a central portion or a middle portion of the baggage-compartment floor 5 in a vehicle width direction. A rear end panel 8 that extends in the vehicle width direction is connected to a rear open end of the spare tire pan 7.

A rear end member 9 that extends in the vehicle width direction is fixed to a rear face of the rear end panel 8. Between the rear end member 9 and the rear end panel 8 is formed a rear-end closed cross section 10 that extends in the vehicle width direction. Thereby, a sufficient rigidity of a rear vehicle body is ensured. A rear bumper 11 is provided behind the rear end member 9.

Meanwhile, a rear baggage-compartment opening 12 that is formed at the rear of the rear baggage compartment 6 is configured to be opened or closed by a rear gate 13, which constitutes part of a hatch back type of vehicle. The rear gate 13 comprises a rear-gate inner panel 14, rear-gate outer panel 15, and rear window pane 16. A specified portion of an inside of the vehicle that faces the rear baggage compartment 6 is covered with a rear-gate trim 17 as an interior trim member.

A rear header 19 (vehicle body rigidity member) that extends in the vehicle width direction is fixed to a rear end portion of a roof panel 18. Between the rear end portion of the roof panel 18 and the rear header 19 is formed a rear-header closed cross section 20 that extends in the vehicle width direction. Thereby, the sufficient rigidity of the rear vehicle body is ensured. An upper end portion of the rear gate 13 is pivotally supported at the closed cross section 20 via a hinge member (not illustrated).

Similarly, a front header 21 (vehicle body rigidity member) that extends in the vehicle width direction is fixed to a front end portion of the roof panel 18. Between the front end portion of the roof panel 18 and the front header 21 is formed a header closed cross section 22 that extends in the vehicle width direction. Thereby, a sufficient rigidity of a front vehicle body is ensured.

An inside of the front header 21, roof panel 18 and rear header 19 is covered with a top ceiling 23 as an interior trim member. At the floor panel is provided a tunnel portion 24 that extends in the longitudinal direction between a dash lower panel (dash panel) and the vertical wall portion 3 of the kick-up portion and projects toward the vehicle compartment 1.

The tunnel portion 24, as a main member for the vehicle body rigidity, interconnects a plurality of cross members 25, 26 (vehicle body rigidity member) that extend in the vehicle width direction between both-side vertical wall portions of the tunnel portion 24 and right-and-left side sills (specifically, side sill inners), not illustrated, as a vehicle body rigidity member having a side-sill closed cross section. The cross members 25, 26 are provided to be apart from each other in the longitudinal direction of the vehicle. Between the cross members 25, 26 and the floor panel 2 are formed closed cross sections 27, 28 that extend in the vehicle width direction, and thereby a sufficient rigidity of a lower vehicle body is ensured.

Also, a rear cross member 29 (vehicle body rigidity member) is fixed to a lower face of a rear portion of the kick-up floor portion 4 and a front end portion of the baggage-compartment floor 5. A closed cross section 30 extending in the vehicle width direction is formed between the both 4, 29. Thereby, the sufficient rigidity of the lower vehicle body is ensured.

Herein, a reference numeral 31 denotes a windshield, a reference numeral 32 denotes a front door, reference numeral 33 denotes a rear door, reference numeral 34 denotes a fuel tank as a large-scaled vehicle component that is provided below the kick-up portion, reference numeral 35 denotes a striker as a lock mechanism to lock the rear gate 13, reference numeral 36 denotes a bumper reinforcement, and reference numeral 37 denotes a center pillar as a vehicle body rigidity member.

Figure 2:
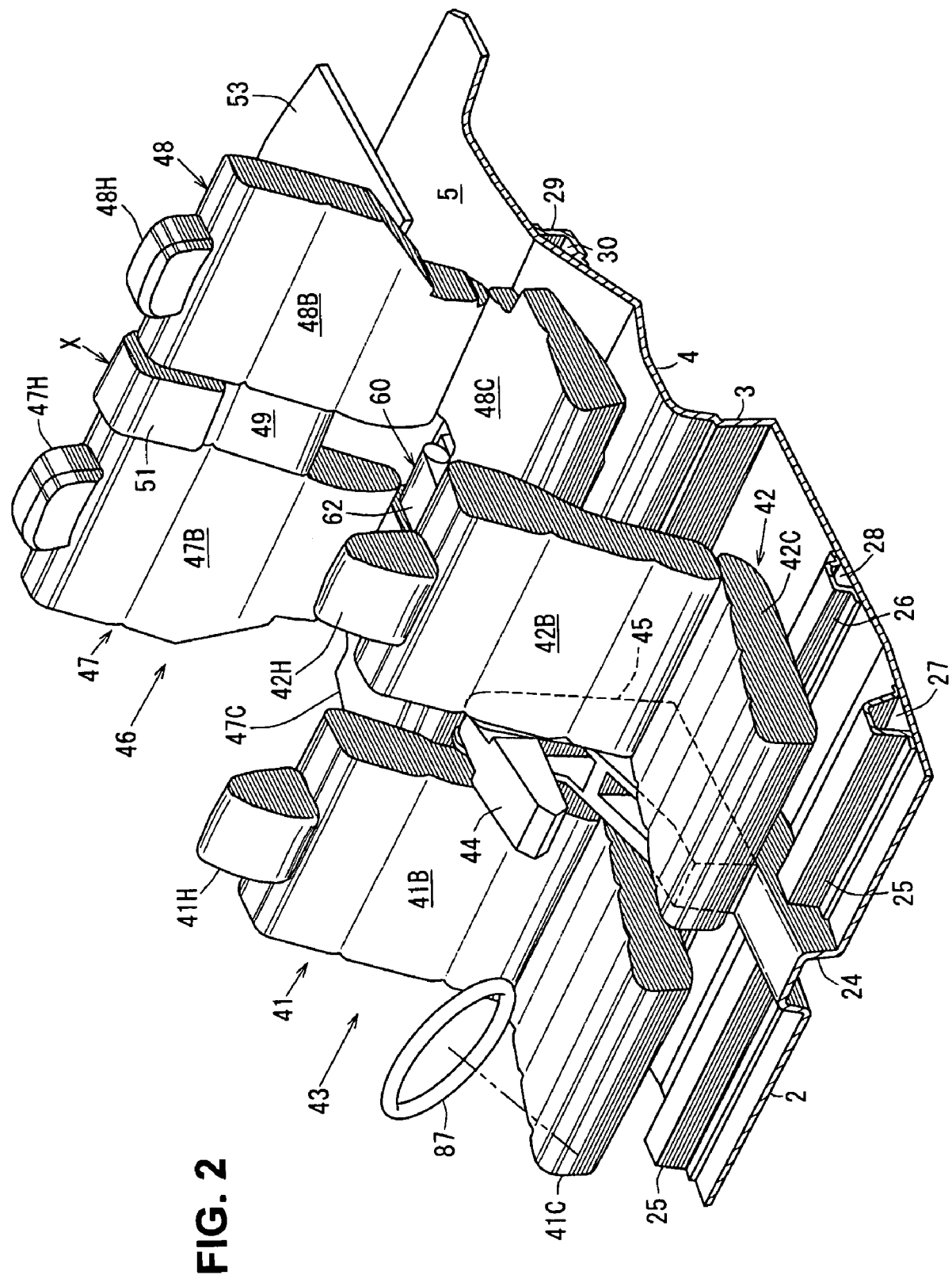
FIG. 2 is a perspective view of the seat device for a vehicle in a normal state.
Figure 3:
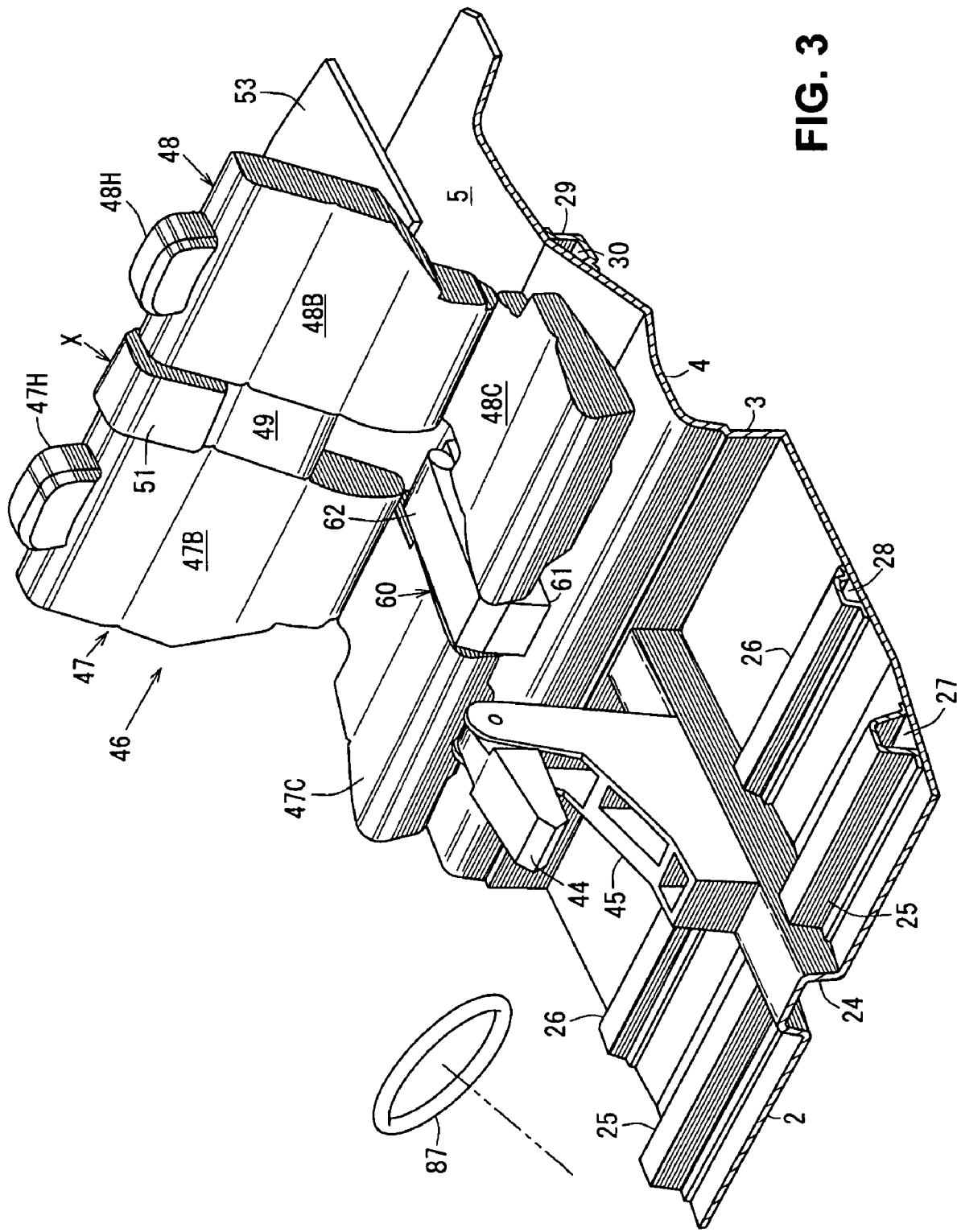
FIG. 3 is a perspective view of the seat device for a vehicle without a front row seat.

Next, the seat device for a vehicle will be specifically described. A front row seat 43, which includes a driver's seat 41 and an assistant seat 42 (so-called passenger seat) beside the driver's seat 41, is provided at a location of the above-described cross member 25, 26 on the floor panel 2 as shown in FIGS. 1 to 3.

The driver's seat 41 comprises a seat cushion 41C that forms a sitting face for the passenger, a seat back 41B that stands upward from a rear end portion of the seat cushion 41C and forms a leaning back face for the passenger, and a headrest 41H that is provided at an upper portion of the seat back 41B and supports a head portion of the passenger.

Likewise, the assistant's seat 42 comprises a seat cushion 42C that forms a sitting face for the passenger, a seat back 42B that stands upward from a rear end portion of the seat cushion 42C and forms a leaning back face for the passenger, and a headrest 42H that is provided at an upper portion of the seat back 42B and supports a head portion of the passenger. The driver's seat 41 and the assistant's seat 42 are supported at seat slide rails for front row seat, not illustrated, so as to slide in the longitudinal direction.

Between the driver's seat 41 and the assistant's seat 42 of the front row seat 43 is horizontally provided an armrest portion for front seat 44 that is operative to allow an object to be placed thereon.

The armrest portion for front seat 44 is, as shown in FIGS. 1 to 3, supported at a floor console portion 45 (so-called center console portion), which is provided on the floor panel 2 between the driver's seat 41 and the assistant's seat 42, independently from both the seats. Thereby, even if the driver's seat 41 and/or the assistant's seat 42 slide in the longitudinal direction, a position of the armrest portion for front seat 44 can be ensured, maintaining a support rigidity of the armrest portion for front seat 44.

A rear row seat 46 is provided behind the front row seat 43. The rear row seat 46 is comprised of a pair of separate rear seats 47, 48, which are provided above the kick-up floor portion 4. Namely, in front of the rear row seat 46 is provided the above-described front row seat 43 with the driver's seat 41 and the assistant's seat 42.

A right-side rear seat 47 comprises a seat cushion 47C that forms a sitting face for the passenger, a seat back 47B that stands upward from a rear end portion of the seat cushion 47C and forms a leaning back face for the passenger, and a headrest 47H that is provided at an upper portion of the seat back 47B and supports a head portion of the passenger.

Likewise, a left-side rear seat 48 comprises a seat cushion 48C that forms a sitting face for the passenger, a seat back 48B that stands upward from a rear end portion of the seat cushion 48C and forms a leaning back face for the passenger, and a headrest 48H that is provided at an upper portion of the seat back 48B and supports a head portion of the passenger.

Figure 4:
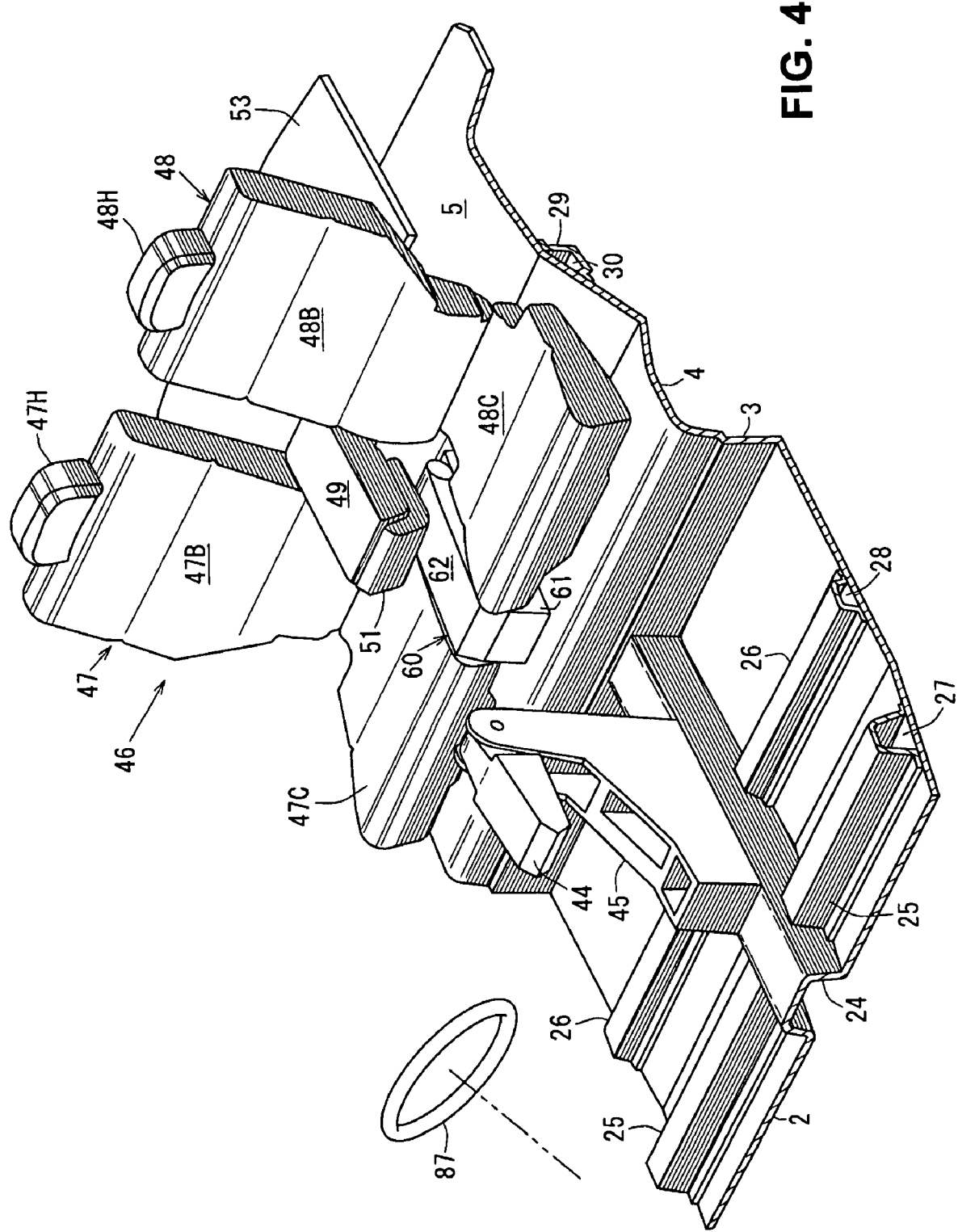
FIG. 4 is a perspective view in a state where an armrest portion for rear seat is moved forward.

Namely, the seat backs 47B, 48B of the rear row seat 46 are provided independently from each other, and between the seat backs 47B, 48B is provided an armrest portion for rear seat 49 as shown in FIG. 4.

The armrest portion for rear seat 49 is configured to rise up rotating around a support point 50 (armrest support point) as shown in FIG. 1. The armrest portion for rear seat 49 forms a seat back for center seat X in its normal state as shown in FIG. 3. Meanwhile, when the armrest portion for rear seat 49 is rotated (rises) forward around the support point 50 away from the seat backs 47B, 48B, it forms an armrest that allows an object to be placed thereon as shown in FIG. 4. Thus, there can be provided a pair of independent rear seats for a small number of passengers (two passengers).

Namely, the armrest portion for rear seat 49 becomes the seat back for center seat X when rising in its upright state (see FIG. 3) and the armrest when laying in its forward-rotated (folded) state (see FIG. 4). The armrest portion for rear seat 49 has a headrest 51 to support a head of the passenger sitting in the center seat.

Figure 5:
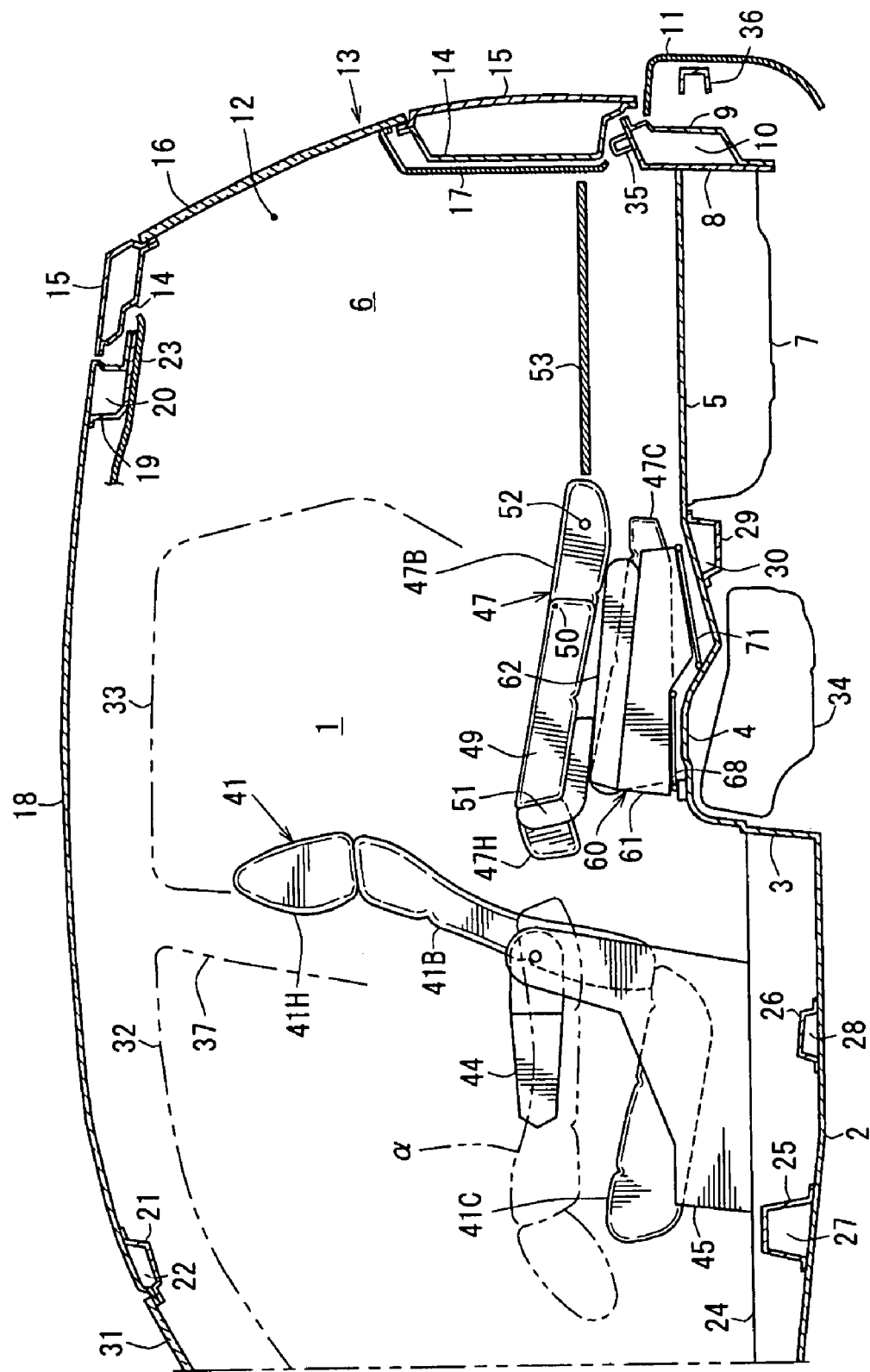
FIG. 5 is a side view in a state where a baggage compartment is expanded.
Figure 6:
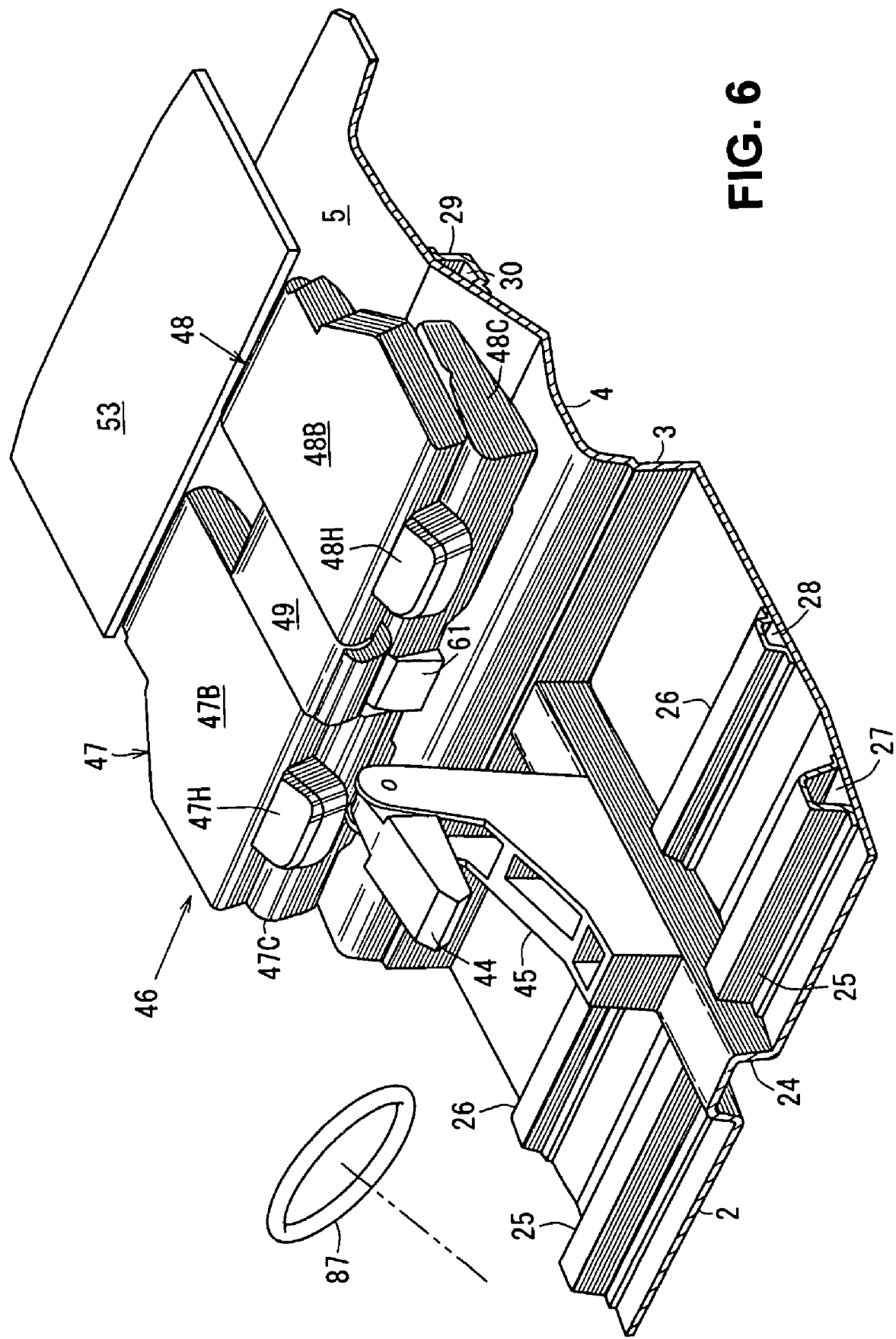
FIG. 6 is a perspective view in the state where the baggage compartment is expanded.

Herein, the seat backs 47B, 48B of the rear row seat 46 are supported via support points 52 (seat-back support points) that are located below the above-described support point 50 so as to be folded (rotated) forward as shown in FIGS. 5 and 6. When the seat backs 47B, 48B are folded on the respective seat cushions 47C, 48C, there can be provided a large and flat baggage compartment as shown in FIGS. 5 and 6.

Below the baggage-compartment floor 5 is horizontally disposed a board 53 operative to partition the rear baggage compartment 6 vertically. Herein, a disposition height of the baggage-compartment partition board 53 is substantially the same as that of rear end portions of the seat backs 47B, 48B in the forward-rotated state as shown in FIG. 5. Accordingly, when the seat backs 47B, 48B of the rear row seat 46 are rotated (folded) forward, an upper face (back face) of the forward-rotated seat backs 47B, 48B and an upper face of the baggage-compartment partition board 53 form substantially a flat face together, thereby providing a large and continuous baggage compartment that is comprised of a rear space of the vehicle compartment 1 and the rear baggage compartment 6. Further, when the seat back 42B of the assistant's seat 42 is folded forward as shown by a broken line α in FIG. 5 or a solid line in FIG. 7, an upper space above the assistant's seat 42 can be a baggage space. Thus, the baggage compartment can be further expanded.

Figure 7:
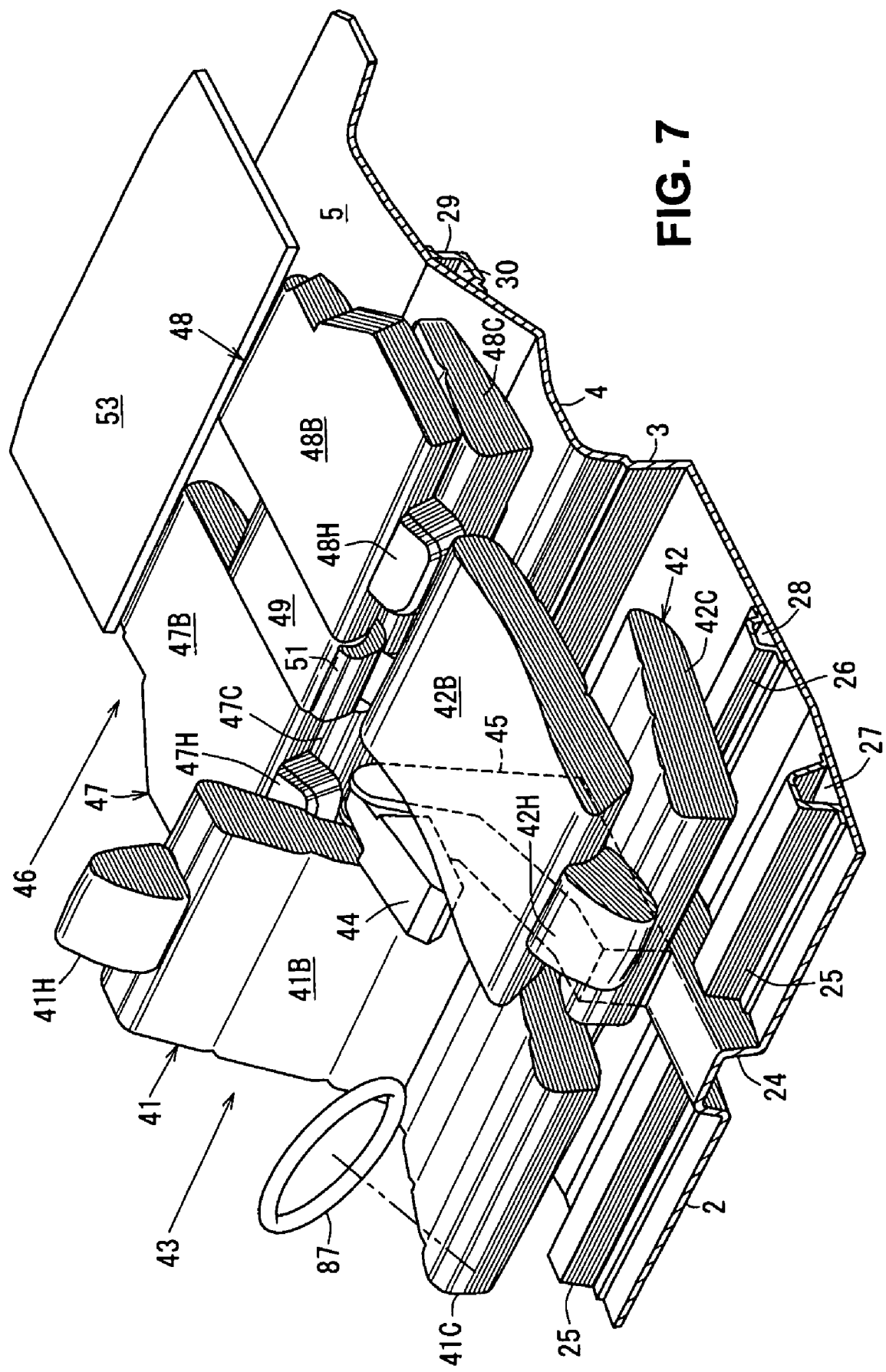
FIG. 7 is a perspective view in the state where the baggage compartment is expanded when a seat back of an assistant's seat is folded.
Figure 8:
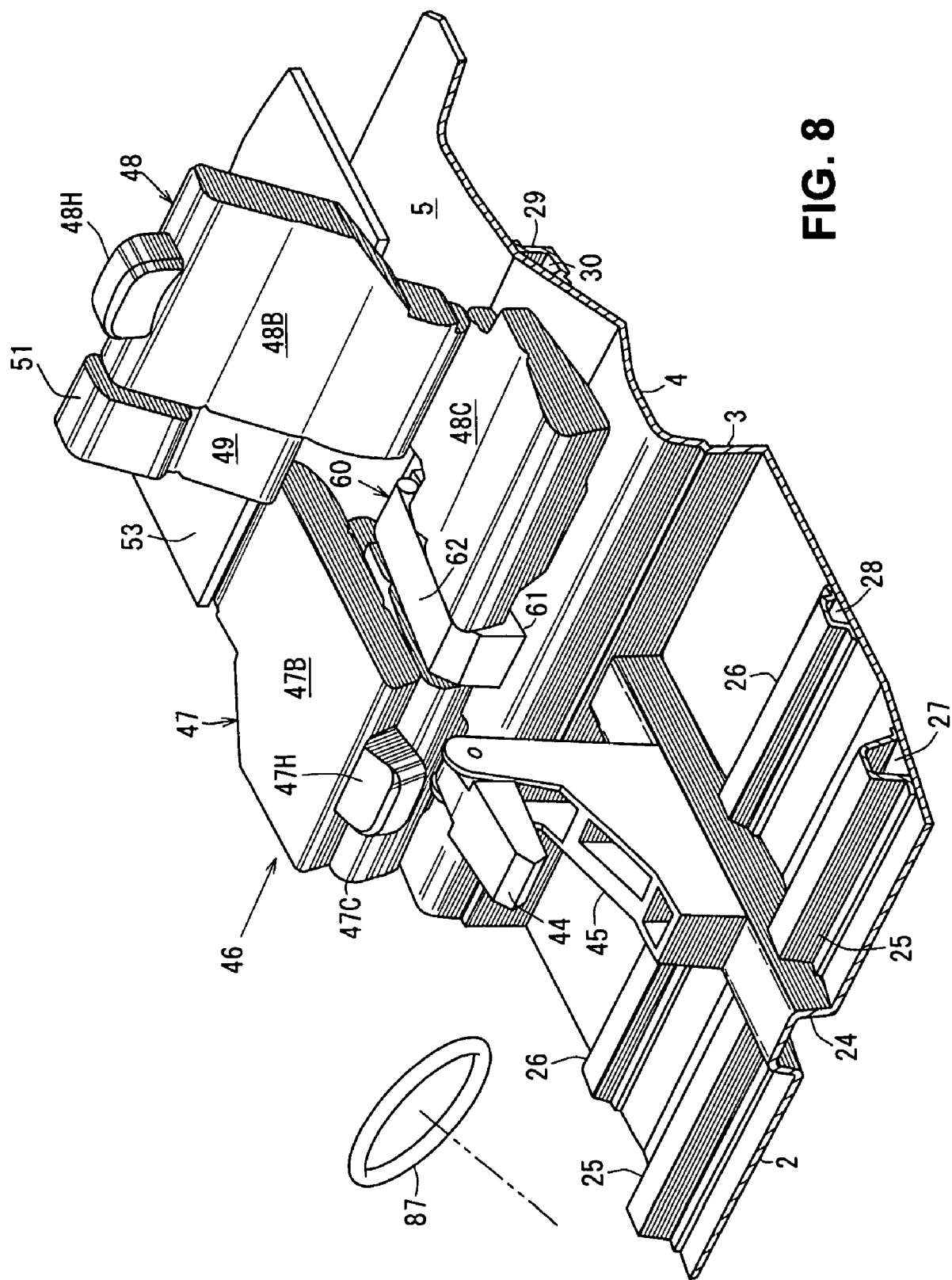
FIG. 8 is a perspective view in a state where only one of seat backs is folded forward.

Both of the seat backs 47B, 48B of the rear row seat 46 can be rotated forward as shown in FIGS. 6 and 7, and either one of them can be rotated forward as shown in FIG. 8 (only the right seat back 47B in FIG. 8). Thereby, the compatibility of the rear passenger's sitting and the expansion of the baggage-compartment space can be obtained.

Figure 9:
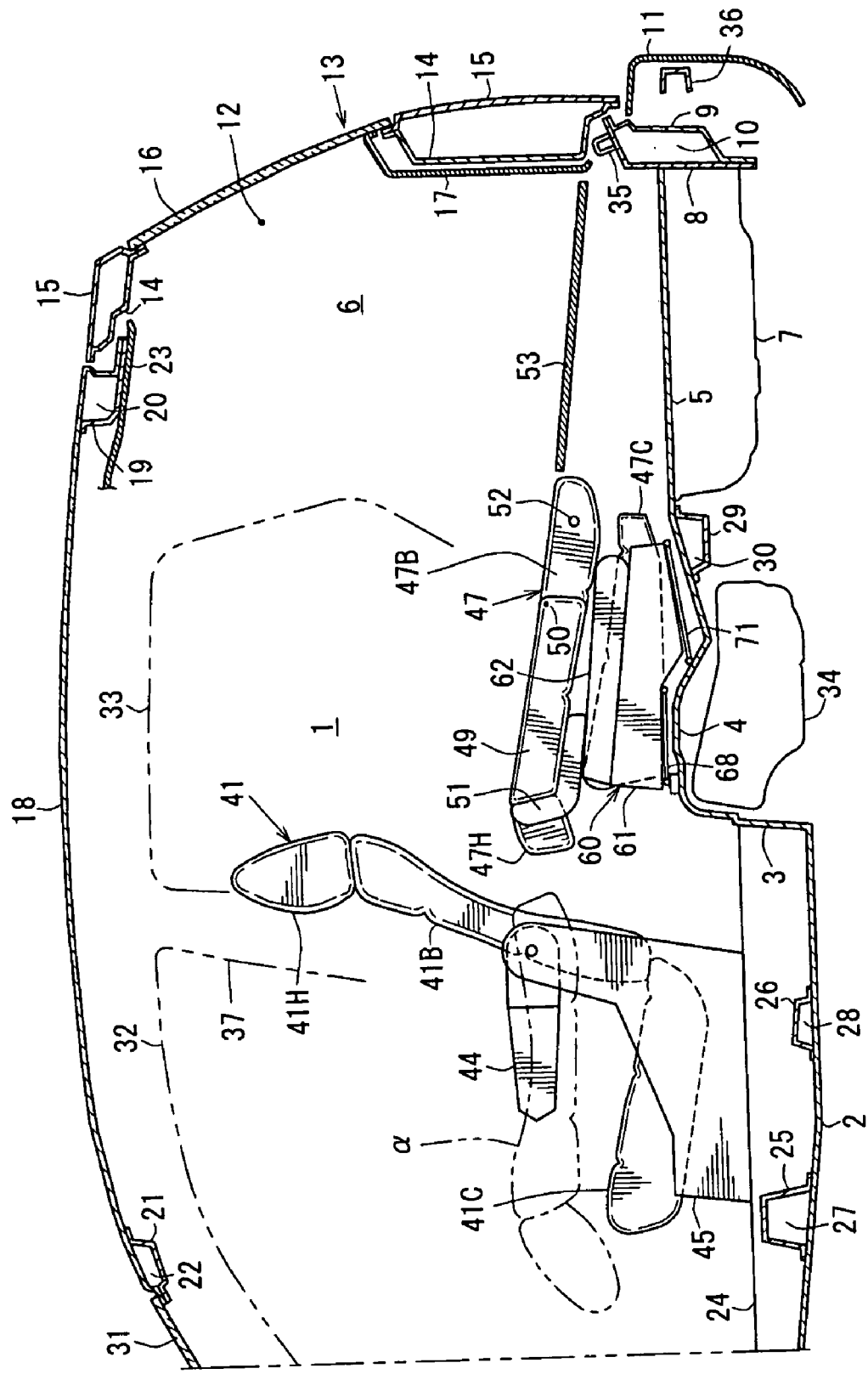
FIG. 9 is a side view of a disposition structure of a baggage-compartment partition board according to an another embodiment.

Herein, the baggage-compartment partition board 53 may be disposed obliquely as shown in FIG. 9, instead of its horizontal disposition shown in FIG. 5. Namely, the baggage-compartment partition board 53 shown in FIG. 9 may be provided in an oblique position in such a manner that its front portion continues to the upper face of the folded seat back 47B (and/or the seat back 48B). Thereby, substantially no gap occurs between the upper face of the folded seat back 47B and/or the seat back 48B and the upper face of the baggage-compartment partition board 53, so the continuous, flat and large baggage compartment may be created.

Figure 10:
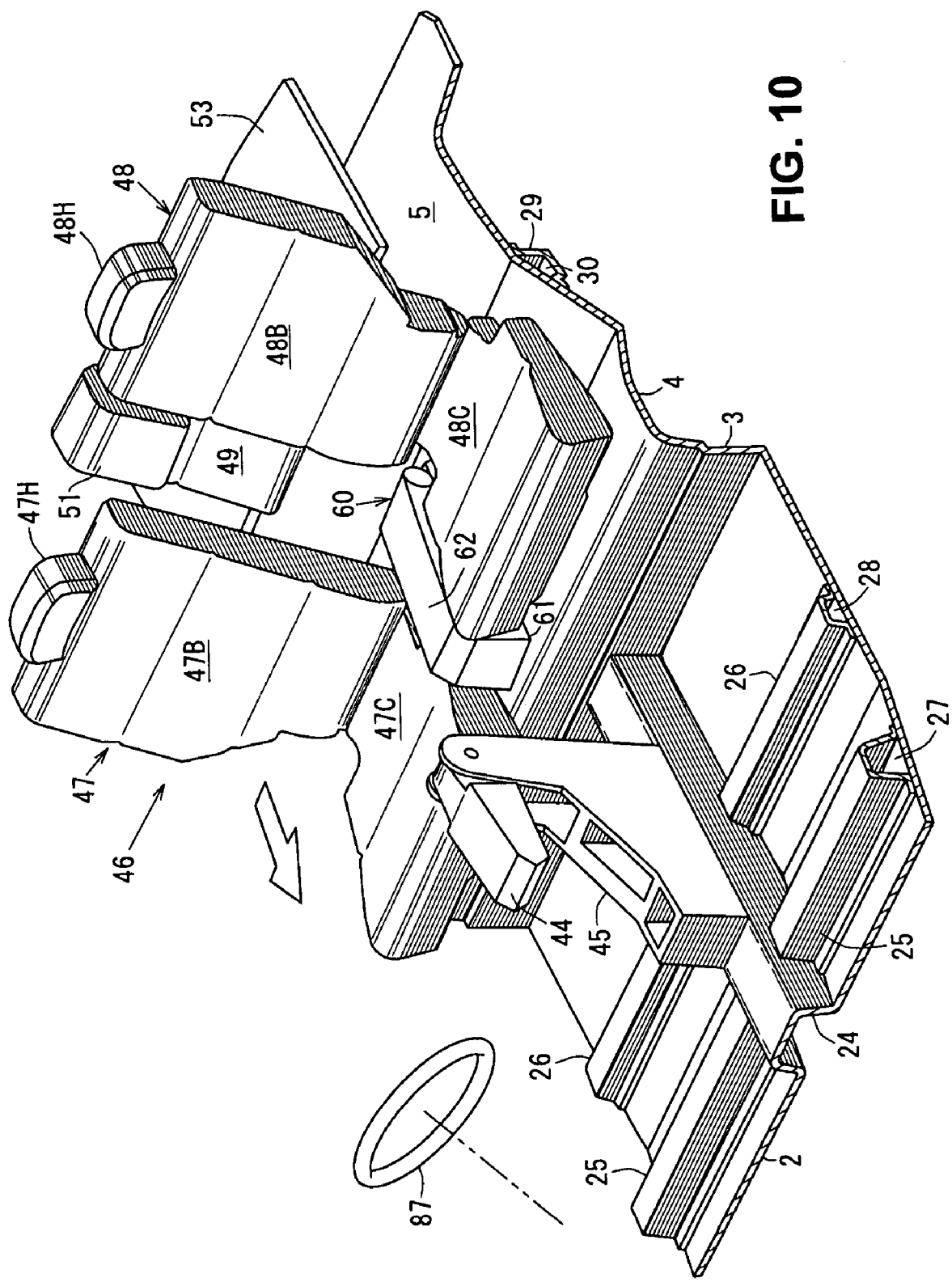
FIG. 10 is a perspective view showing a longitudinal slide state of a rear row seat.

Also, the rear seats 47, 48 of the rear row seat 46 are configured to slide in the longitudinal direction along seat slide rails 54 (seat slide device with upper and lower rails) shown in FIG. 1. The armrest portion for rear seat 49 is attached to the seat back of either one of these rear seats. In the present embodiment, as shown in FIG. 10, the armrest portion for rear seat 49 is attached to the seat back 48B of the left-side rear seat 48. In FIG. 10, the left-side rear seat 48 is shown in its normal state without longitudinal sliding and the right-side rear seat 47 is shown in its sliding state where it has slid forward along the seat slide rail 54. Thus, the space of the baggage compartment and the passenger compartment is configured so as to be properly adjusted by the longitudinal slide of the rear row seat 46.

Meanwhile, as shown in FIGS. 3 and 4, a center seat cushion 60 as a movable cushion portion that is operative to move upward and forward away from the seat cushions 47C, 48C is provided at a central portion between the seat cushions 47C, 48C of the rear row seat 46.

The center seat cushion 60 becomes a center seat cushion when it is in a normal state shown in FIG. 3, which can provide a space for a third passenger sitting in the rear row seat 46 with the armrest portion for rear seat 49 of the center seat back X. Namely, three-passenger rear seat can be provided by an arrangement shown in FIG. 3, while two-passenger rear seat with a pair of independent seats can be provided by an arrangement shown in FIG. 4. Thus, both types of rear seat arrangement are selectively available at needs.

The center seat cushion 60 comprises a body portion 61 and a lid member 62 provided at the top of the body portion 61. The lid member 62 can be opened and closed selectively, and a storage portion 84 (see FIG. 25) that is covered with the lid member 62 is formed at the body portion 61.

Figure 11:
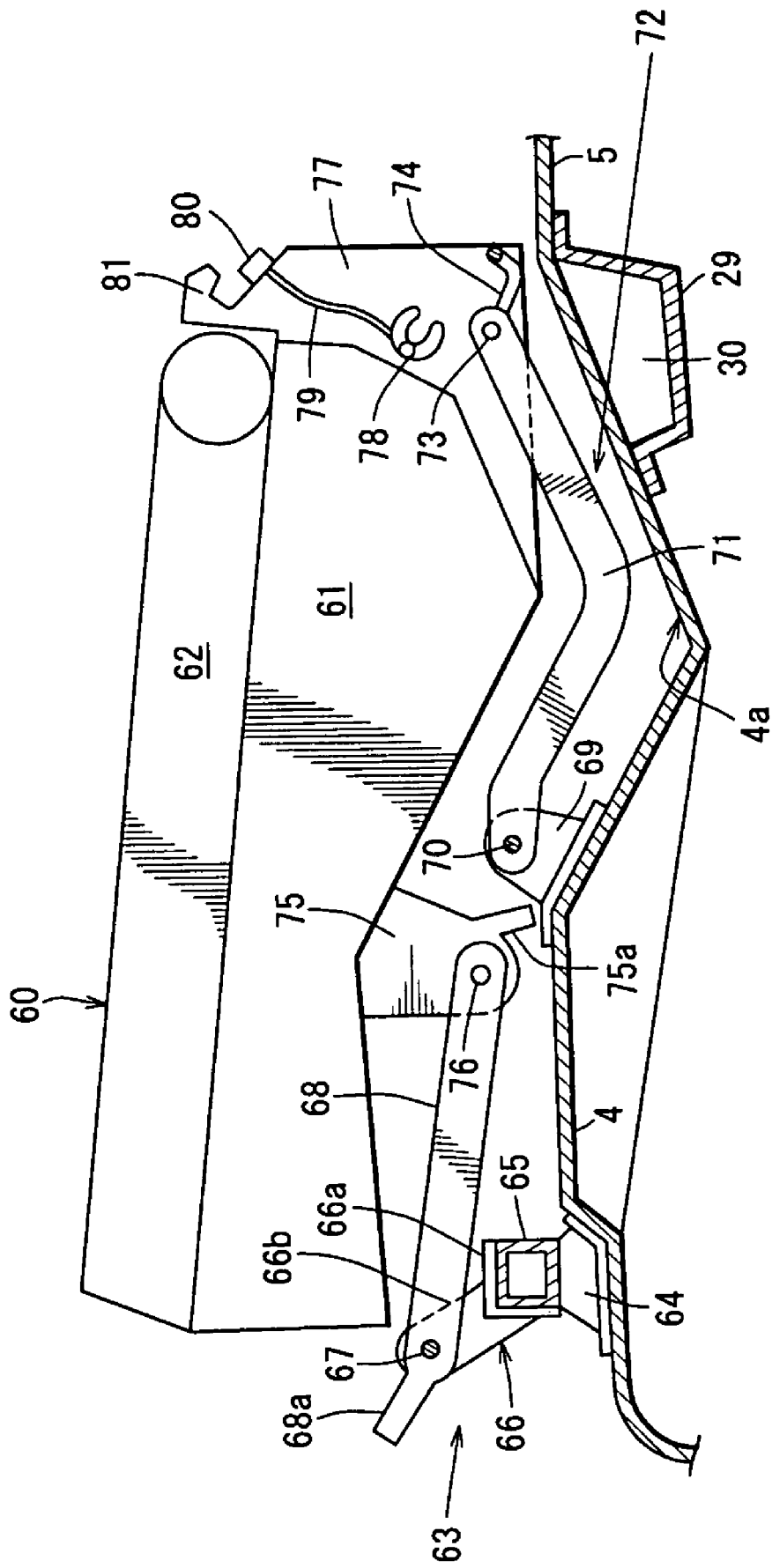
FIG. 11 is a side view of a seat-cushion moving mechanism operative to move a center seat cushion that is in a stored state.
Figure 12:
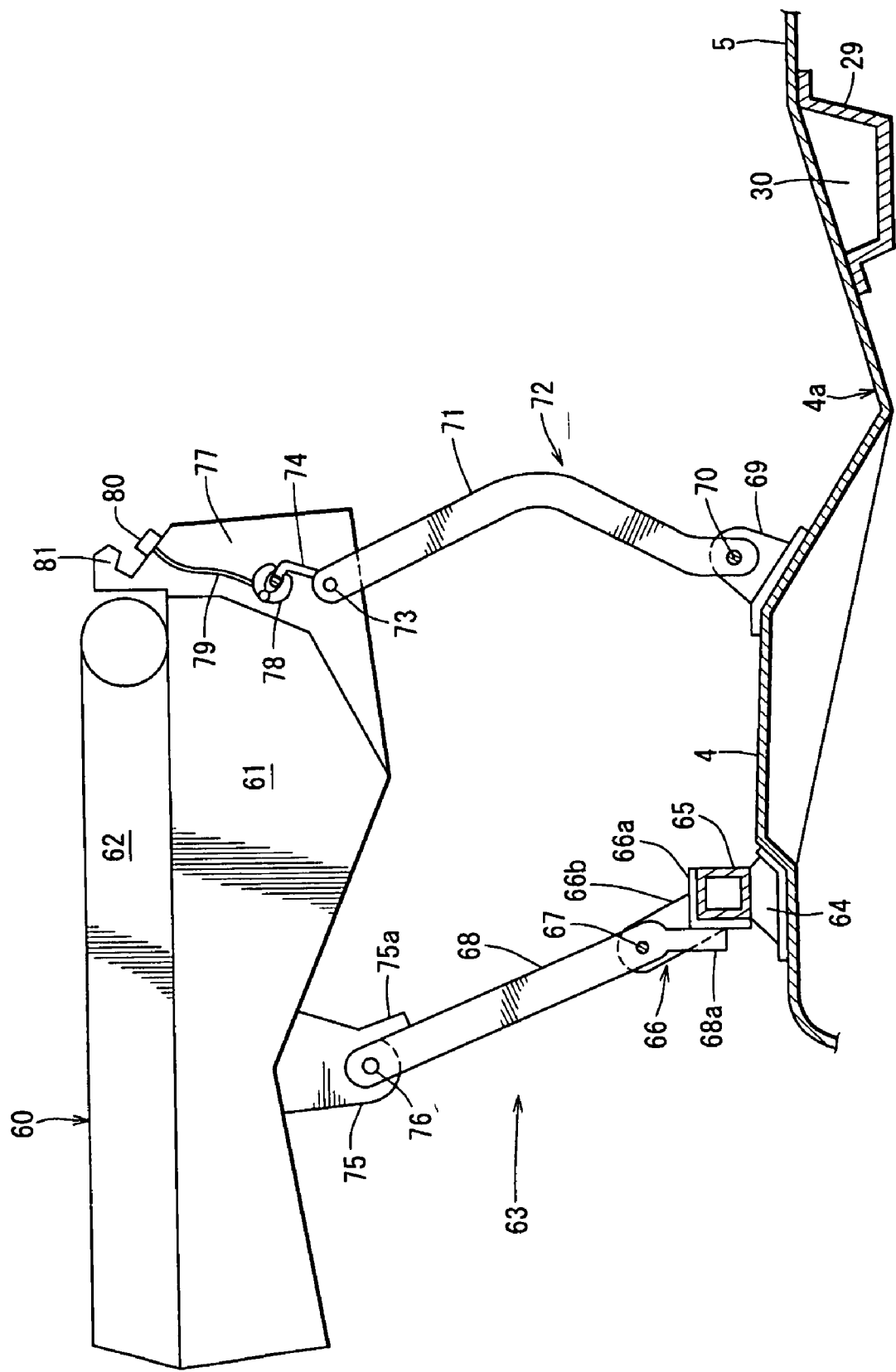
FIG. 12 is a side view in a state where the center seat cushion is moved upward and forward by the seat-cushion moving mechanism.

The center seat cushion 60 is configured to move upward and forward as shown in FIG. 12 from its normal state forming the center seat cushion shown in FIGS. 3 and 11. Next, a center-seat-cushion moving mechanism 63 as a cushion moving mechanism operative to move the center seat cushion 60 upward and forward will be described.

Figure 13:
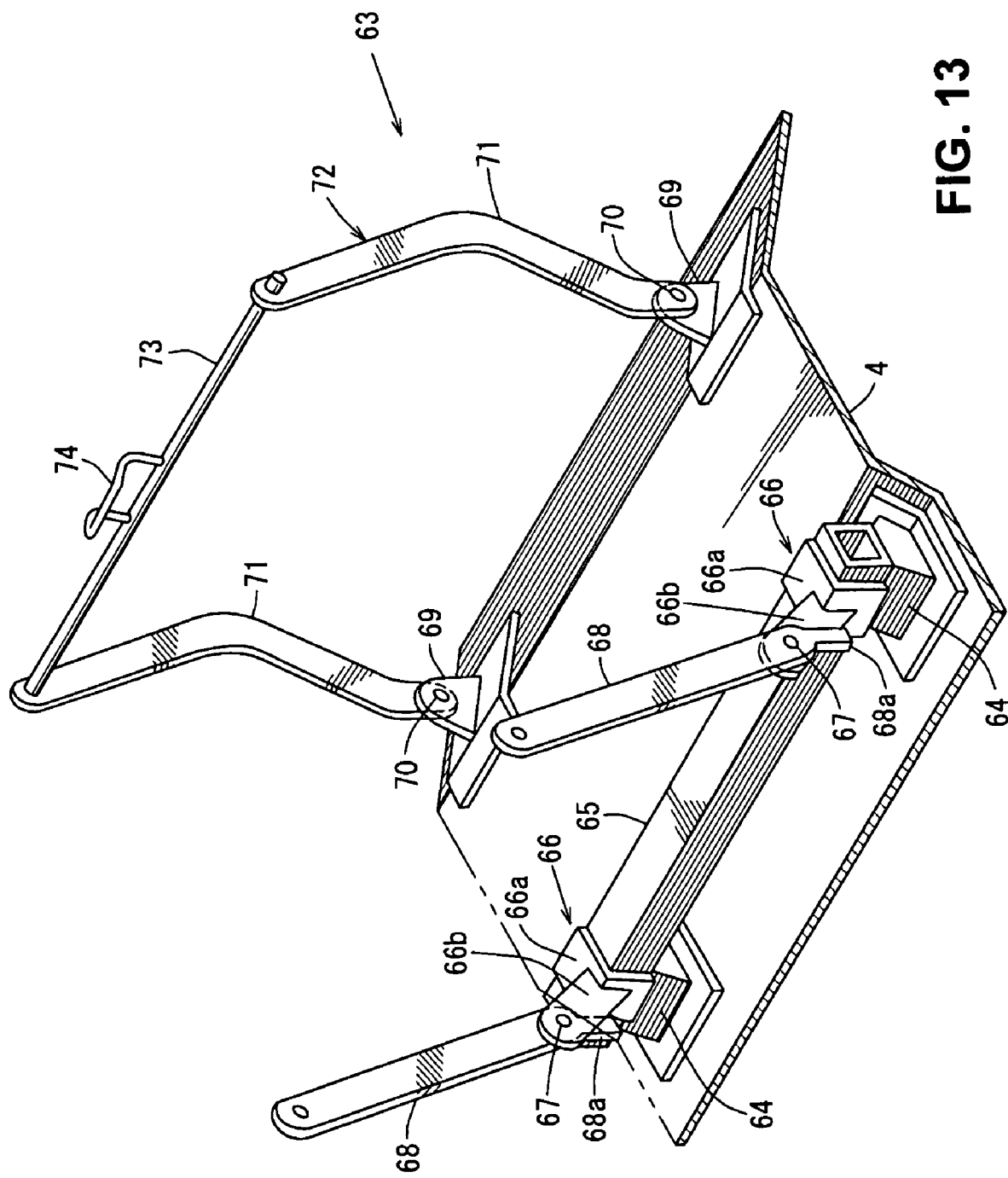
FIG. 13 is a perspective view of the seat-cushion moving mechanism.

As shown in FIGS. 11, 12 and 13, a pair of brackets 64, 64 are fixed to a front portion of an upper face of the kick-up floor portion 4, and a base member 65 (rigidity member), which is made of a metal rectangular pipe and has a closed cross section, is provided to extend in the vehicle width direction between the brackets 64, 64.

Further, a pair of pivot brackets 66, 66 that includes L-shaped base portions 66a and projecting pieces 66b respectively is provided and fixed to the base member 65 so as to correspond to the both brackets 64, 64.

To the projecting pieces 66b is attached a pair of front-side link members 68, 68 via pins 67, 67 (front-side lower pivotal axis).

Further, a pair of pivot brackets 69, 69 is provided at a central portion or a rear portion of the upper face of the kick-up floor portion 4, corresponding to the above-described brackets 64, 64. A pair of rear-side link members 71, 71 is attached to the pivot brackets 69, 69 via pins 70, 70 (rear-side lower pivotal axis). Thus, in total, four of the link members 68, 68, 71, 71 form a link mechanism 72. Namely, the above-described center-seat-cushion moving mechanism 63 is comprised of the link mechanism 72, and the lower end portion of the link mechanism 72 is attached to the kick-up floor portion 4 of the floor panel of the vehicle. Thereby, the support rigidity is ensured.

A substantially V-shaped recess portion 4a is formed at a rear portion of the kick-up floor portion 4 so as to have its shape corresponding to an upper shape of the fuel tank 34 (see FIGS. 1 and 5). The rear-side link members 71, 71 has a bend shape that corresponds to the shape of the recess portion 4. The link members 71, 71 are located in the recess portion 4a when the center seat cushion 60 is in the normal state shown in FIG. 11. Namely, the link members 71, 71 are configured to be stored by utilizing a space of the recess portion 4a.

Also, a rod member 73 is provided so as to extend in the vehicle width direction to interconnect both tips of the link members 71, 71 fixedly, and a striker 74 is fixed to a center of the rod member 73.

Meanwhile, a pivot bracket 75 is fixed to a central portion of the lower face of the body portion 61 of the center seat cushion 60. The front-side link members 68, 68 are connected to the pivot bracket 75 via a pin 76 (front-side upper pivotal axis).

To a rear portion of the body portion 61 of the center seat cushion 60 is attached a body frame 77. Both ends of the rod member 73 are pivotally supported at the body frame 77.

The body frame 77 includes a latch 78 to lock the striker 74, operational member 80 (e.g., lock release bottom) to operate a lock or unlock of the latch 78 via a cable 79, and a handle portion 81 (grip portion) for the passenger pulling up the center seat cushion 60.

When the center seat cushion 60 is pulled up from its seat state shown in FIG. 11 by puling the handle portion 81, it moves upward and forward with the moving of the four link members 68, 68, 71, 71 as shown in FIG. 12. Then, the striker 74 engages with the latch 78, and stopper 68a fixed to the base end portions of the link members 68, 68 contact front faces of the base portions 66a of the pivot brackets 66 so that their position is limited as shown in FIG. 12. Further, a stopper 75*a* fixed to a rear portion of the pivot bracket 75 at the body portion 61 contacts the back faces of the tips of the link members 68, 68 so that the position is limited. Thereby, the center seat cushion 60 moving upward and forward is fixed to its position at a specified level.

Figure 14:
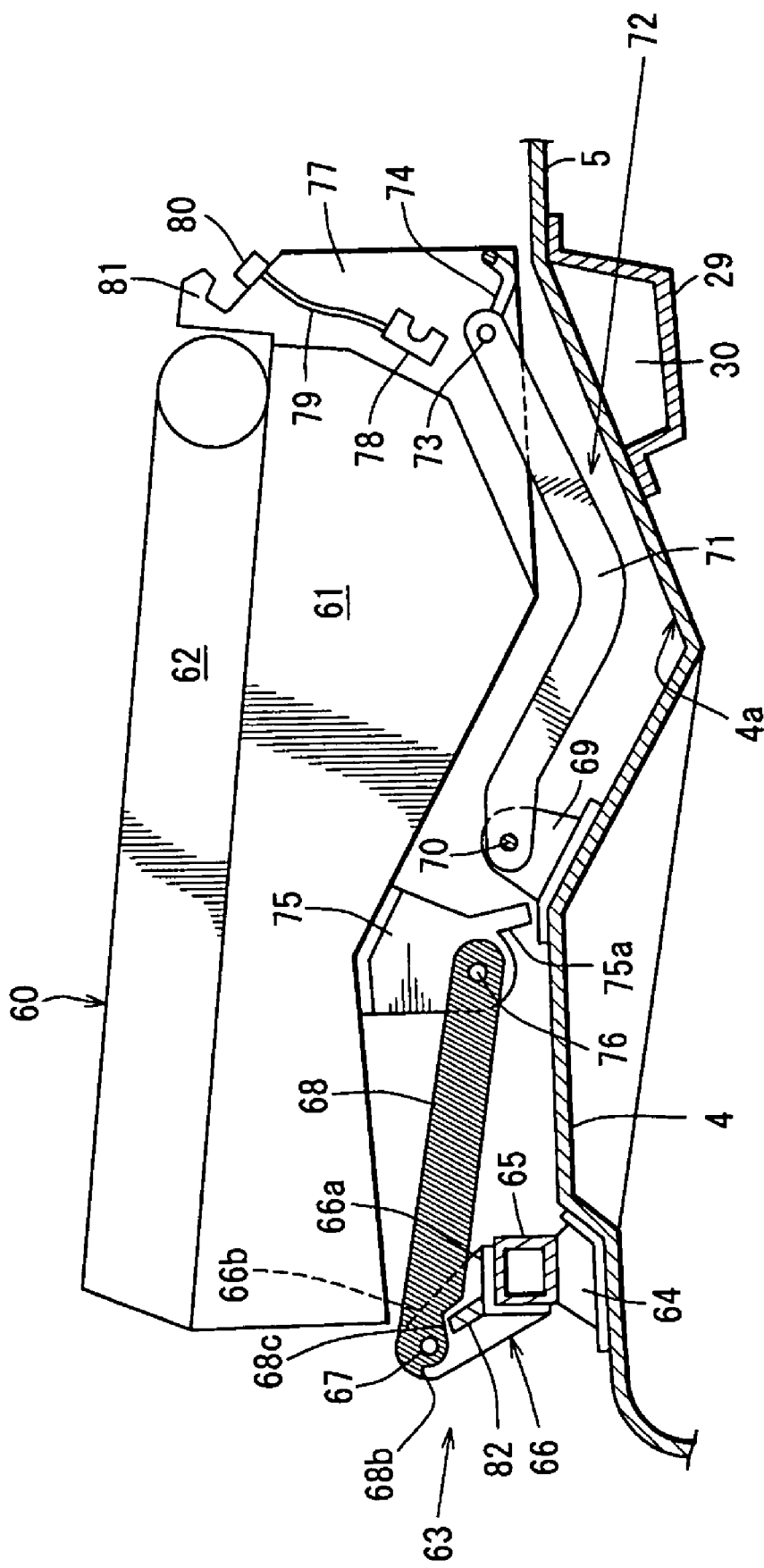
FIG. 14 is a side view of a seat-cushion moving mechanism in a stored state according to another embodiment.
Figure 15:
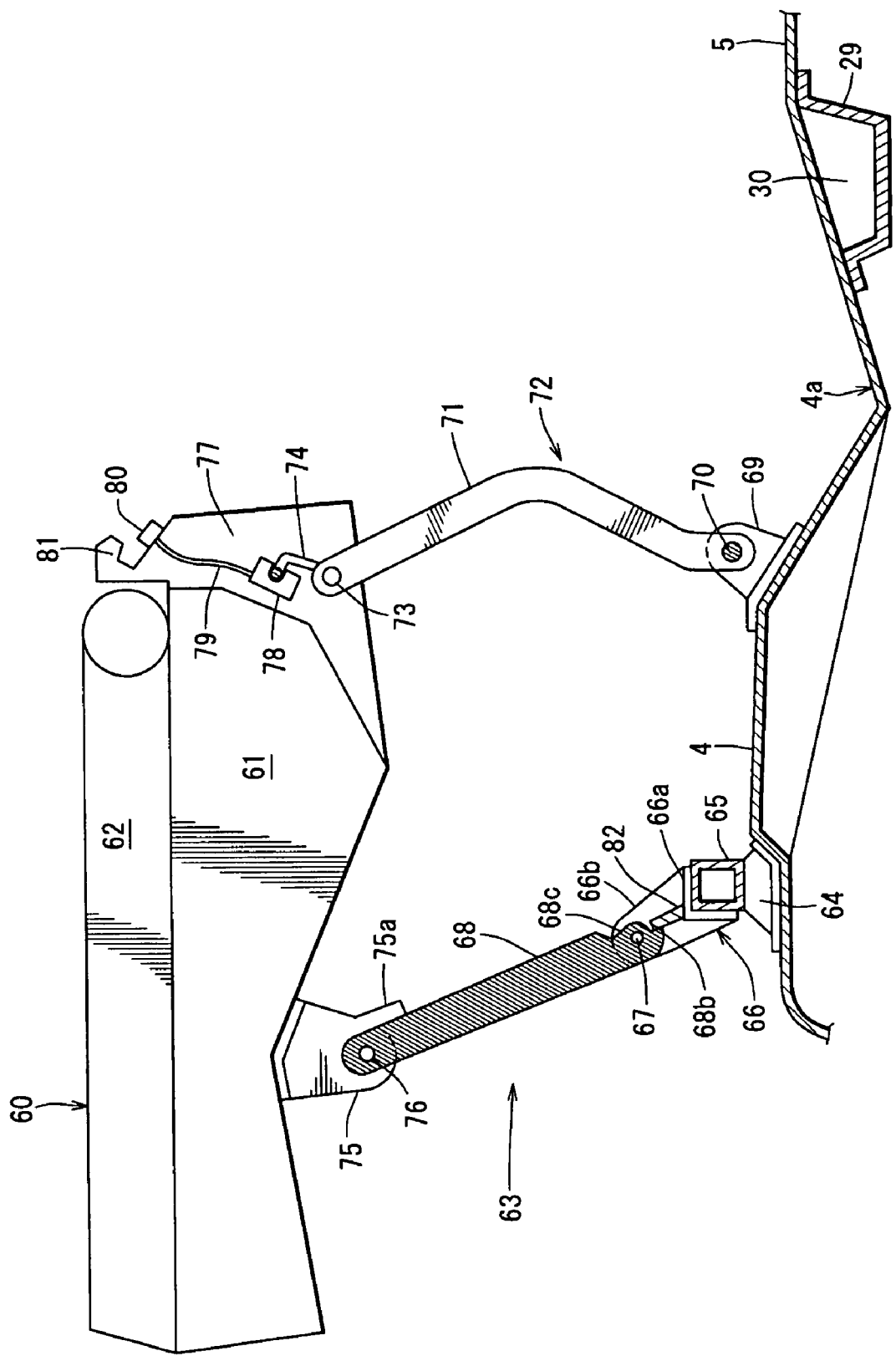
FIG. 15 is a side view of the seat-cushion moving mechanism in a moved state according to the another embodiment.

Another structure of the center-seat-cushion moving mechanism 63, which is shown in FIGS. 14 and 15, may be applied in place of the structure shown in FIGS. 11 to 13. In the present structure of FIGS. 14 and 15, instead of the stoppers 68*a* fixed at the base end portion of the link members 68 (see FIGS. 11 to 13), stoppers 82 are formed integrally with the pivot brackets 66, and at the base end portions of the link members 68 are provided engagement notches 68*b* and recess portions 68*c*. Herein, the engagement notches 68*b* contact the stoppers 82 when the center seat cushion 60 moves upward and forward. Meanwhile, when the center seat cushion 60 is stored, an interference with the stoppers 82 can be avoided by providing the recess portions 68*c*.

According to the above-described structure, the stoppers 82 can be prevented from projecting forward when the center seat cushion 60 is stored (see FIG. 14). Other structure, operations, and effects of the structure of FIGS. 14 and 15 are substantially the same as those of the center-seat-cushion moving mechanism 63, so the same reference characters are applied for those parts, omitting specific descriptions of those. Herein, a general type of latch may be applied for the above-described latch 78 as shown in FIGS. 14 and 15.

Figure 16:
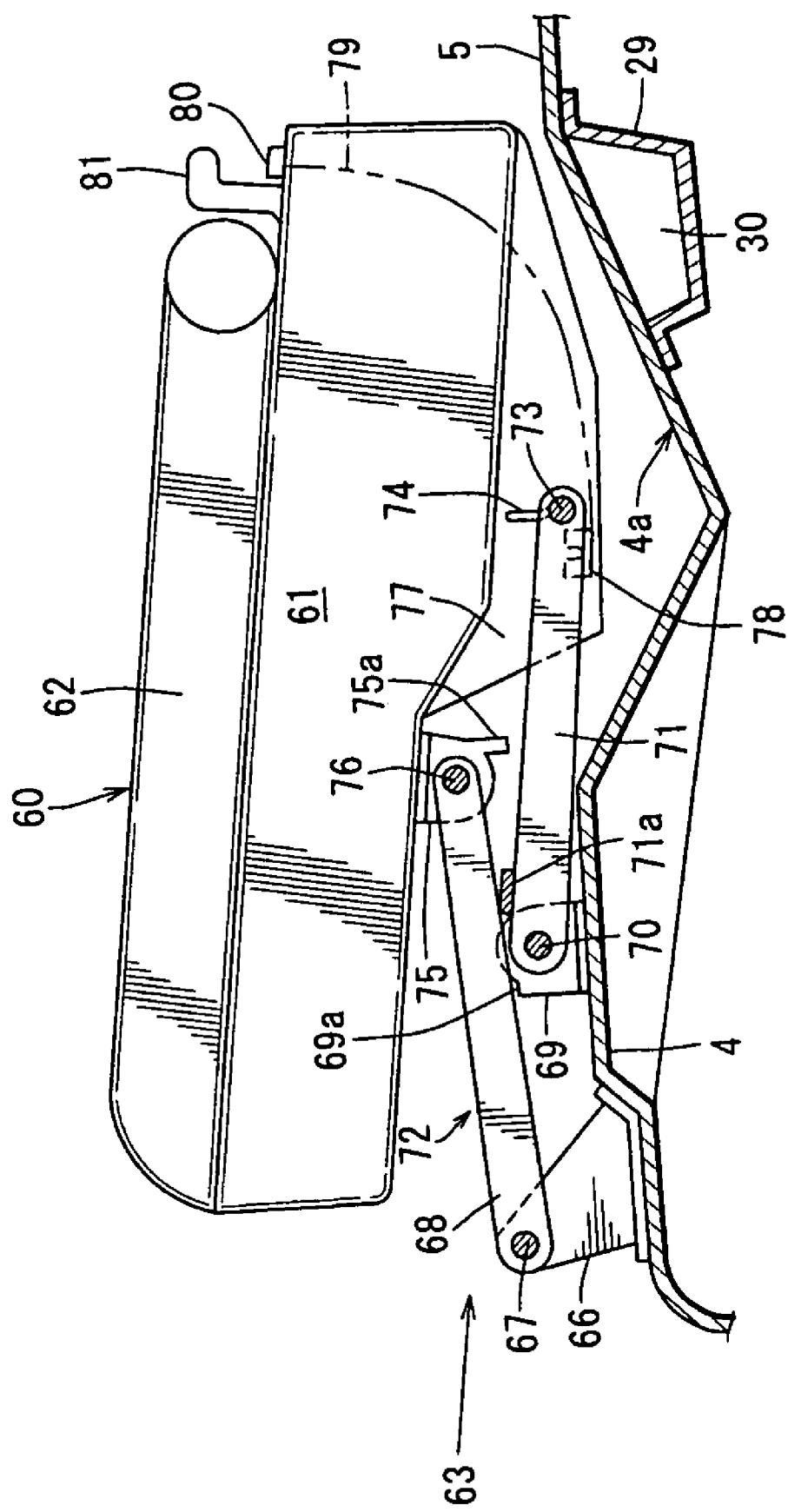
FIG. 16 is a side view of a seat-cushion moving mechanism in a stored state according to further another embodiment.
Figure 17:
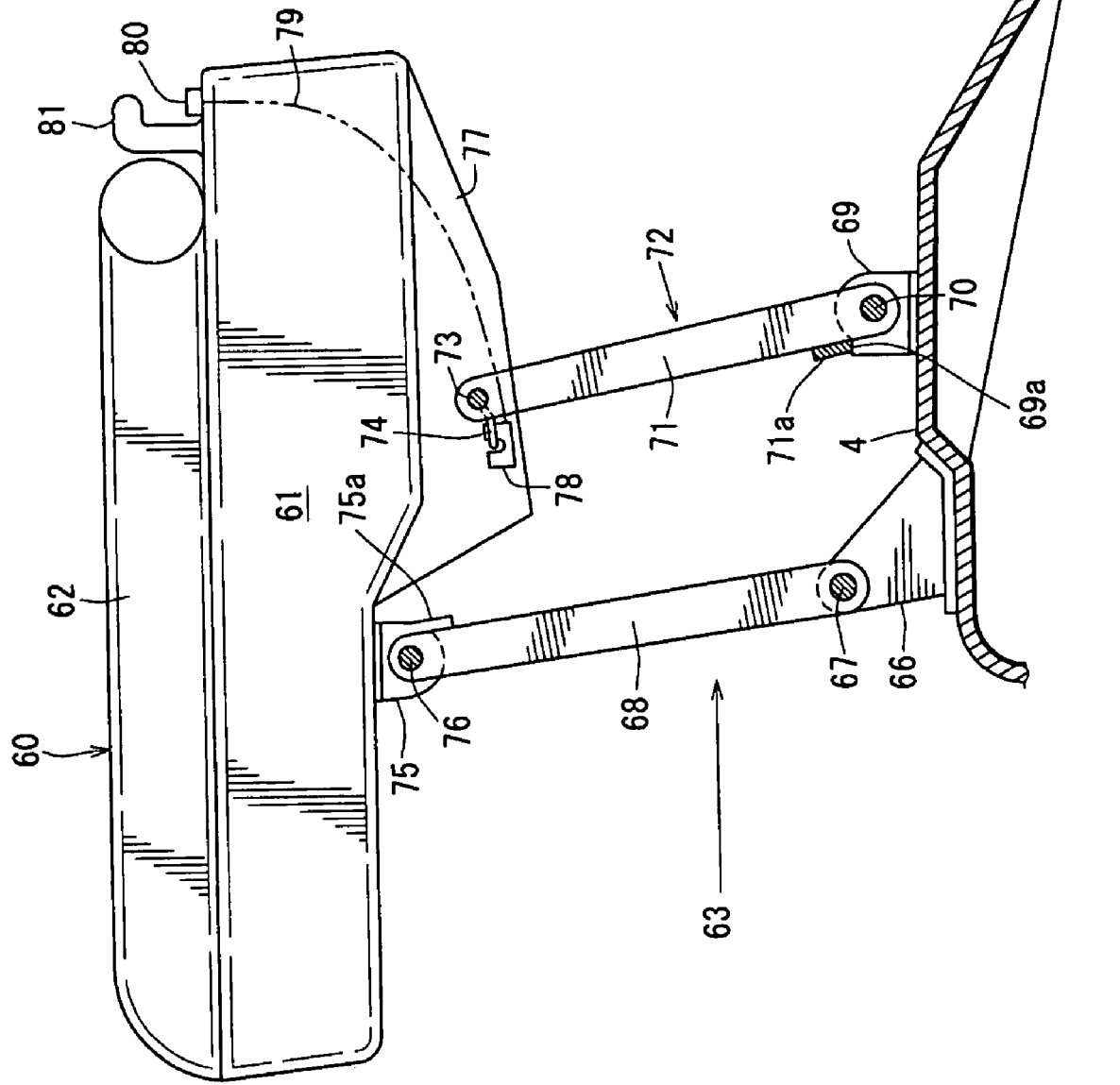
FIG. 17 is a side view of the seat-cushion moving mechanism in a moved state according to the further another embodiment.

Further another structure of the center-seat-cushion moving mechanism 63, which is shown in FIGS. 16 and 17, may be applied in place of the structures of FIGS. 11 to 13 or FIGS. 14 and 15.

In the present structure of FIGS. 16 and 17, the body frame 77 is attached to the lower portion of the body portion 61, the latch 78 to lock the above-described striker 74 is fixed to the body frame 77, and the longitudinal length of the body portion 61 is configured to be as longer as possible. Meanwhile, engagement step portions 69*a* are formed at the pivot brackets 69 fixed to the kick-up floor portion 4. Stoppers 71*a* that contact the engagement step portions 69*a* when the center seat cushion 60 moves upward and forward are formed integrally with the rear-side link members 71.

Other structure, operations, and effects of the center-seat-cushion moving mechanism 63 of FIGS. 16 and 17 are substantially the same as those of the mechanisms of FIGS. 11 to 13, or FIGS. 14 and 15, so the same reference characters are applied for those parts, omitting specific descriptions of those.

Figure 18:
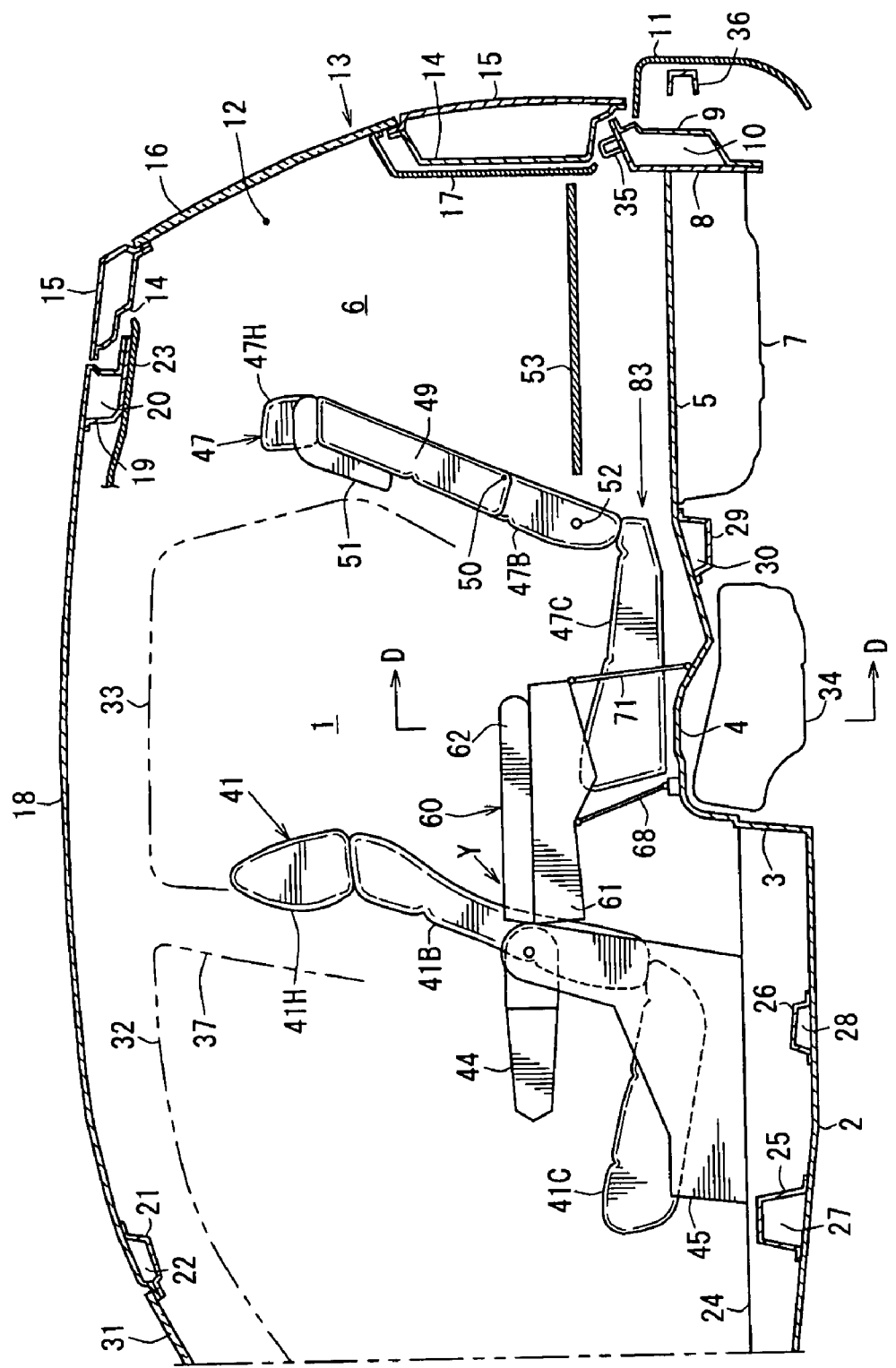
FIG. 18 is a side view showing a continuous structure of an armrest portion for front seat and the center seat cushion.
Figure 19:
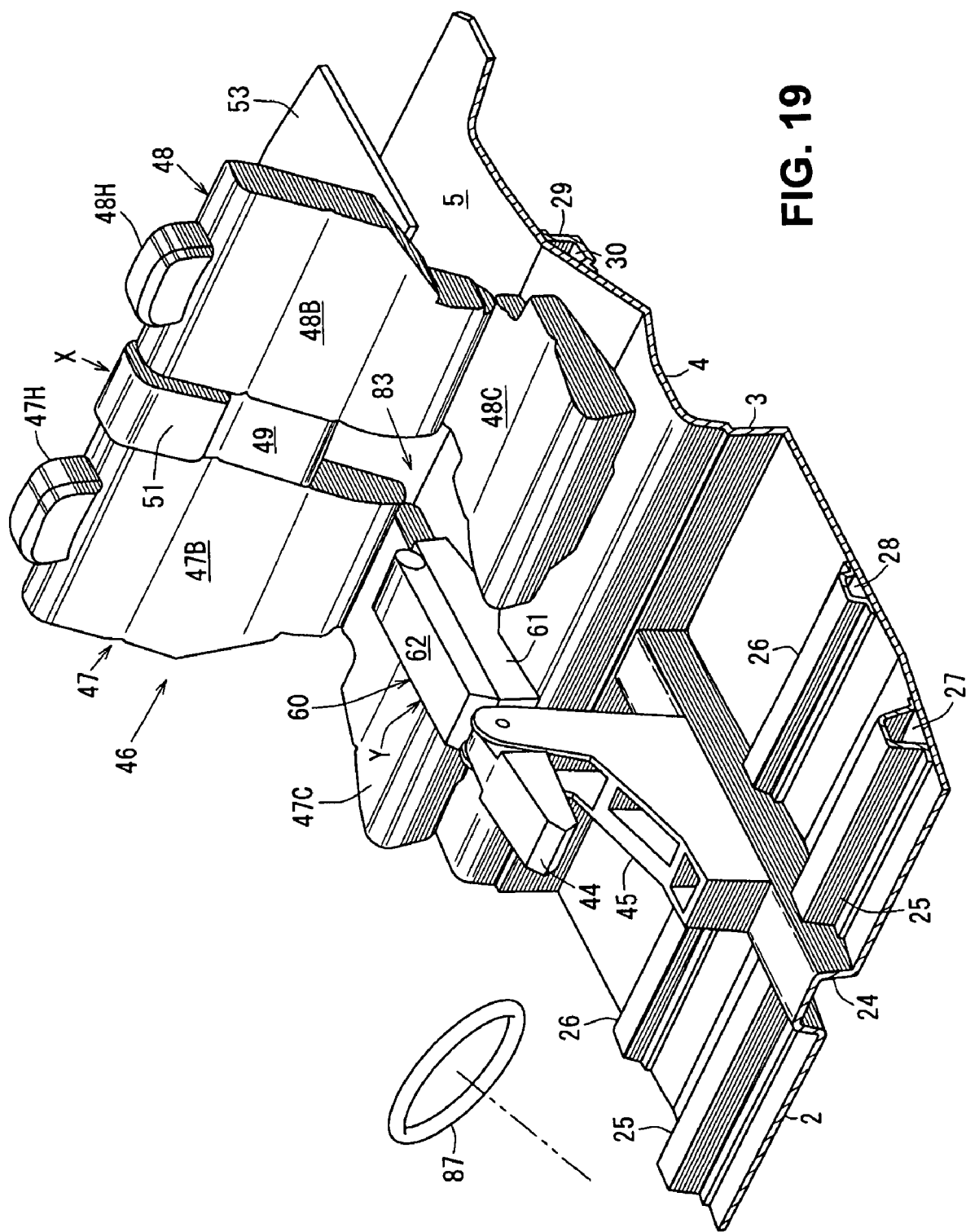
FIG. 19 is a perspective view of a major portion of FIG. 18.

As shown in FIGS. 18 and 19, when it moves upward and forward away from the seat cushions 47C, 48C, the center seat cushion 60 moves to the position near the rear end of the armrest portion for front seat 44, and these seat cushion 60 and armrest portion 44 form together a console portion Y at a continuous level.

Figure 20:
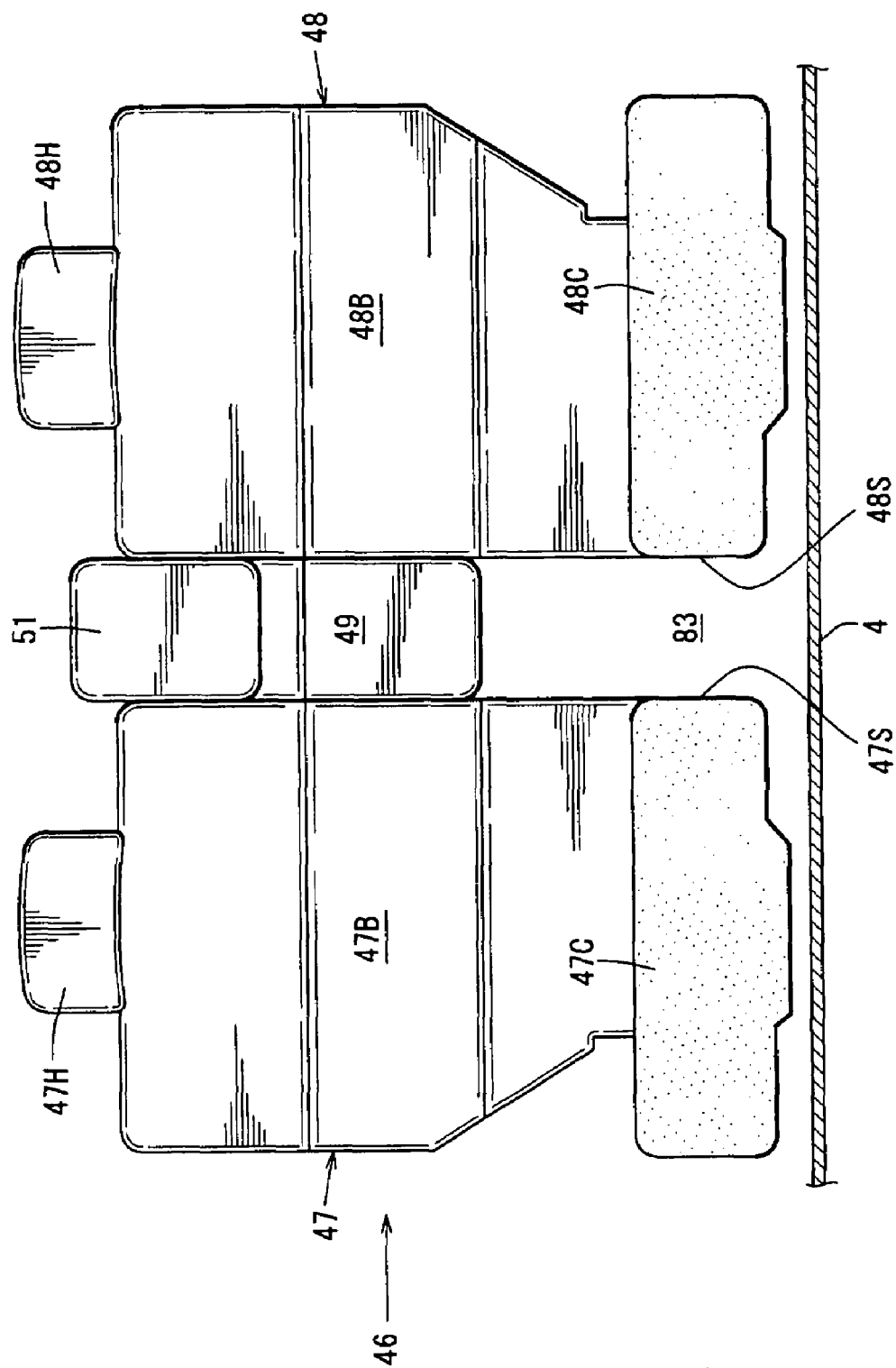
FIG. 20 is an elevation view of the rear row seat seen along line D-D of FIG. 18.

When the center seat cushion 60 moves upward, as shown in FIGS. 18, 19 and 20, a baggage-compartment space 83 is formed with the rear baggage compartment 6 and the vehicle compartment 1. This baggage-compartment space 83 will become a convenient space that is partitioned by the upper face of the kick-up floor portion 4 of the floor panel and inner face portions 47S, 48S of the seat cushions 47C, 48C, as shown in FIG. 20.

Figure 21:
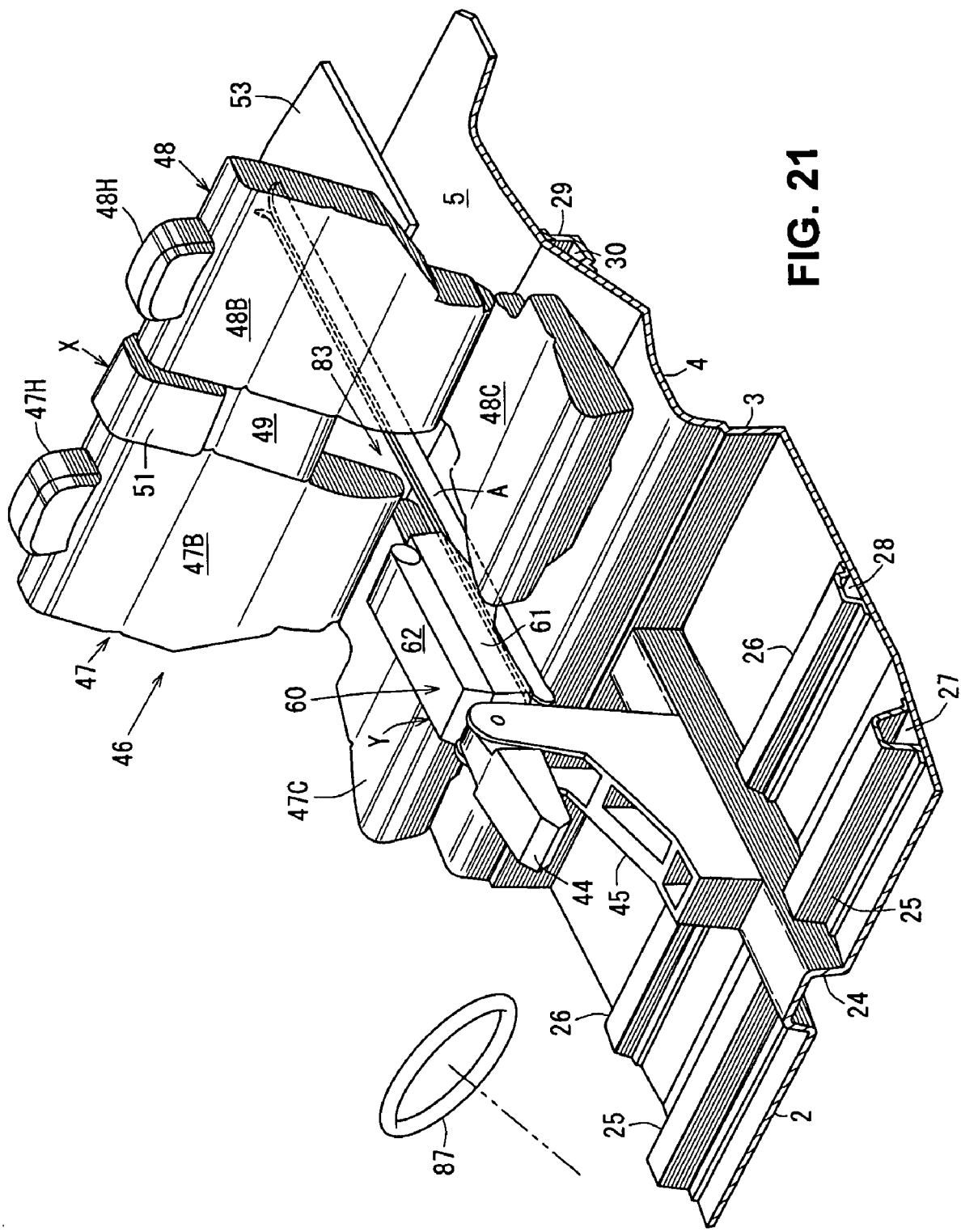
FIG. 21 is a perspective view of an example of baggage loading.

A long baggage, such as a ski, can be properly stored in the above-described baggage-compartment space 83 as shown in FIG. 21. When the armrest portion for rear seat 49 located between the seat backs 47B, 48B of the rear seats 47, 48 of the rear seat 46 moves forward from the state shown in FIGS. 18 and 19 to the state shown in FIGS. 22 and 23, it is positioned at the level continuous to the rear end of the center seat cushion 60 that has moved upward and forward described above. Thus, as shown in FIGS. 22 and 23, the upper face of the armrest portion for front seat 44, the upper face of the center seat cushion 60, and the upper face form a longitudinally continuous, large and flat face for allowing objects to be placed thereon.

In other words, the center seat cushion 60 is configured to be movable to the location near the front end of the armrest portion for rear seat 49 in the rotated forward so that the armrest portion for rear seat 49 and the center seat cushion 60 can form a console portion Z at a continuous level.

Figure 22:
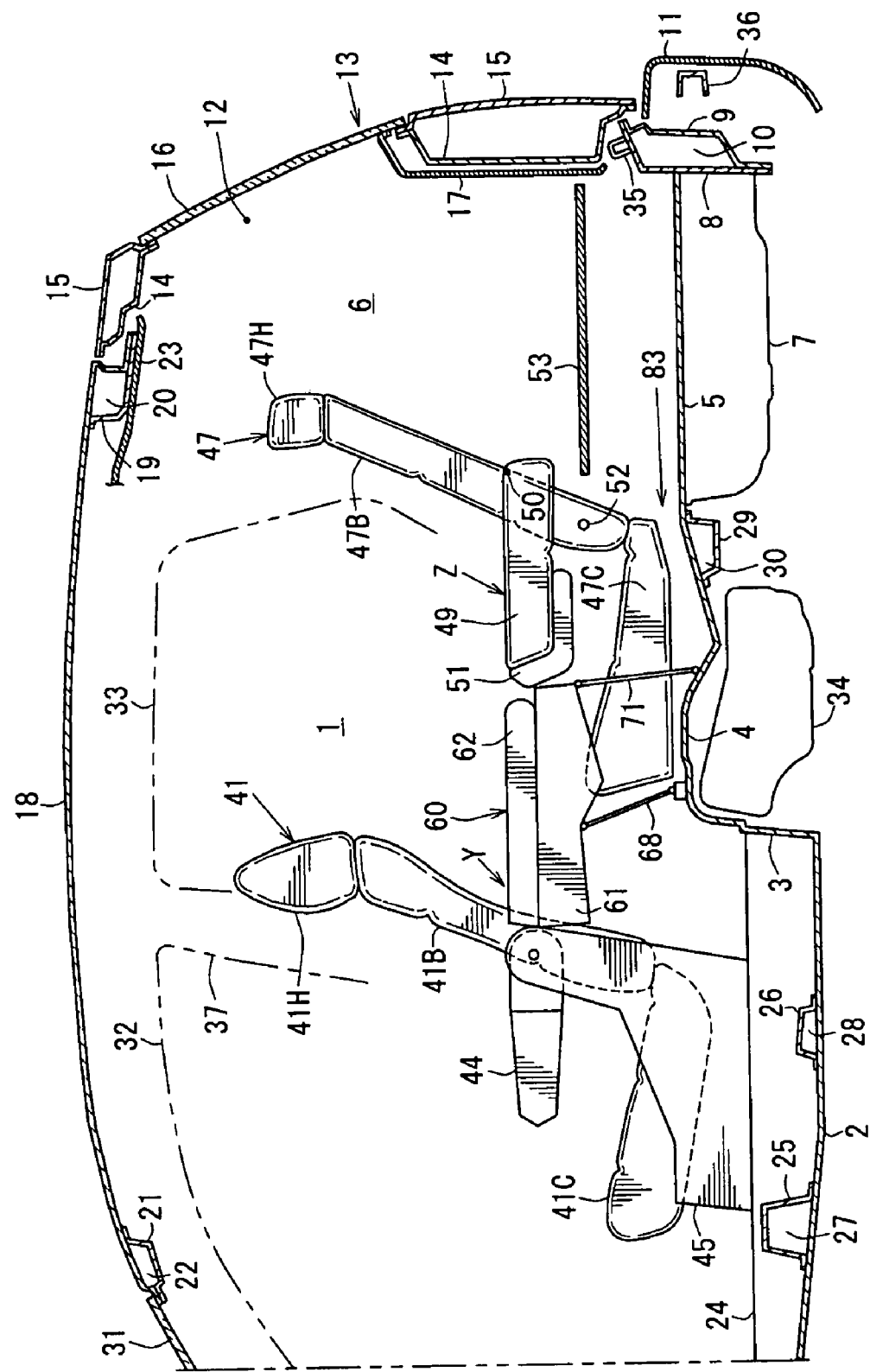
FIG. 22 is a side view showing a continuous structure of the armrest portion for front seat, center seat cushion and armrest portion for rear seat.
Figure 23:
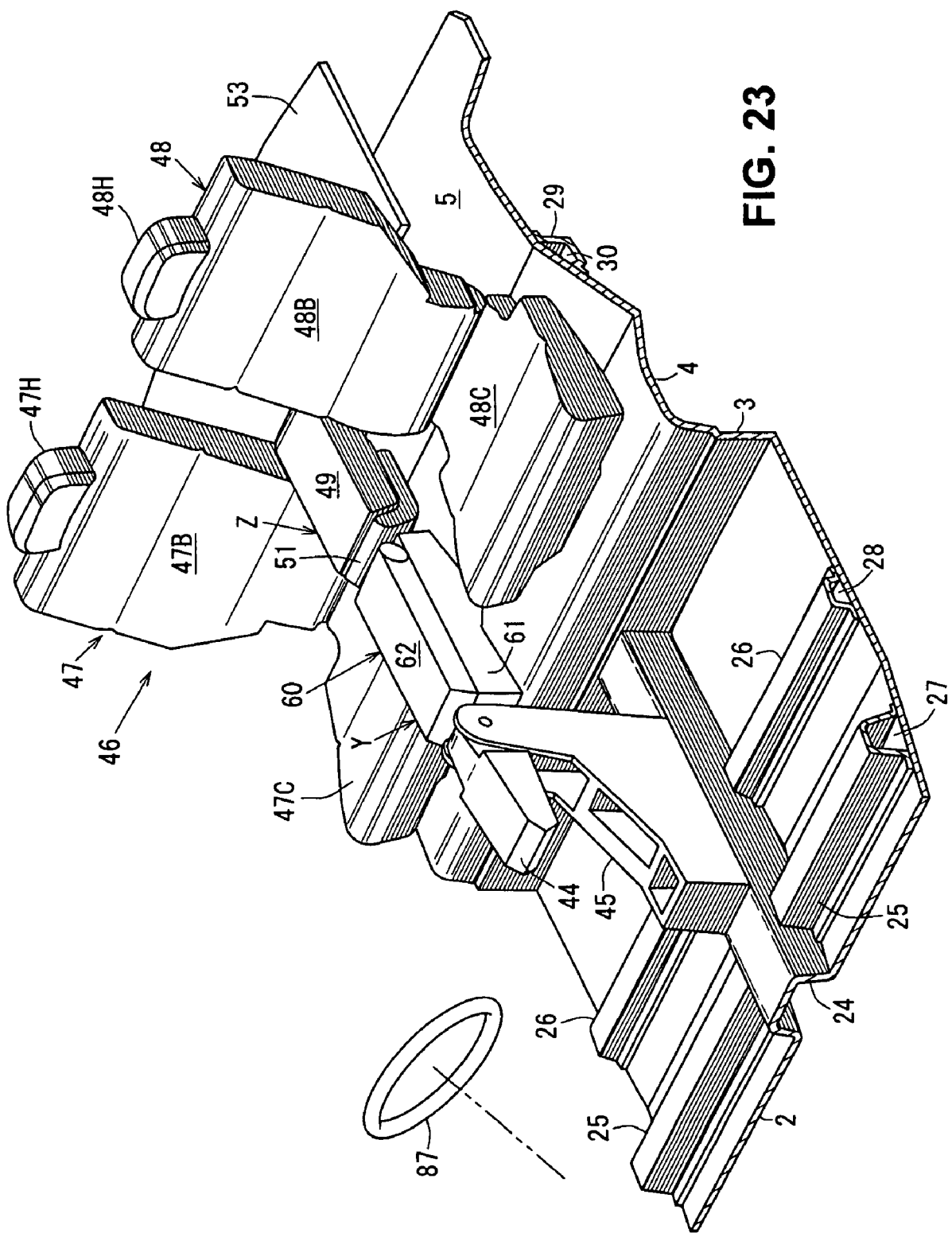
FIG. 23 is a perspective view of a major portion of FIG. 22.
Figure 24:
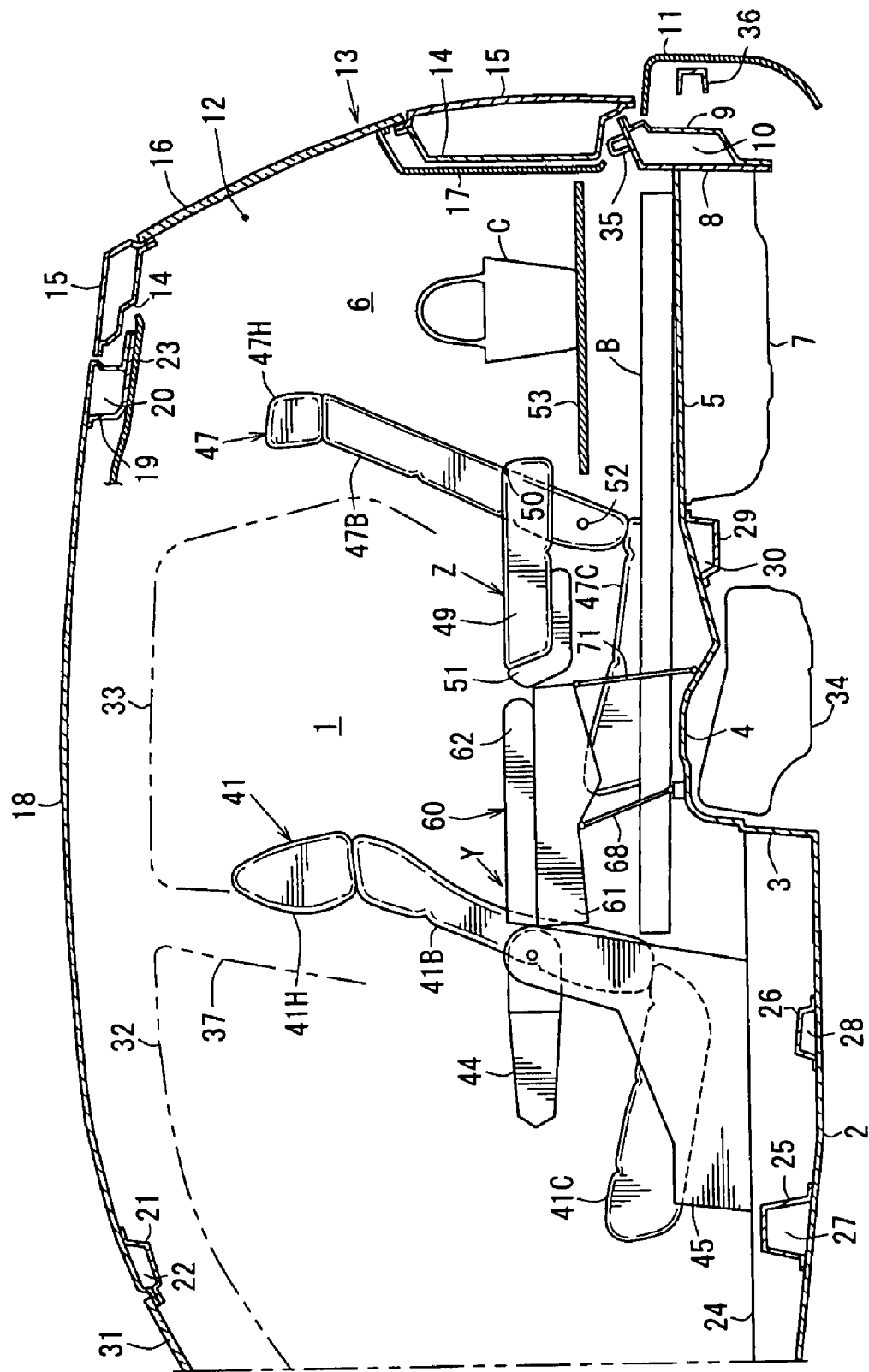
FIG. 24 is a side view of an example of baggage loading.

Since the baggage-compartment space 83 is maintained and part of this space 83 is covered with the armrest portion for rear seat 49 in the state shown in FIG. 22, a long baggage B can be stored in this space 83 and also another baggage C, such as a bag, can be placed on the baggage-compartment partition board 53 as shown in FIG. 24. Herein, the long baggage B is covered with the center seat cushion 60, armrest portion for rear seat 49, baggage-compartment partition board 53, so the long baggage B can be stored inconspicuously.

Figure 25:
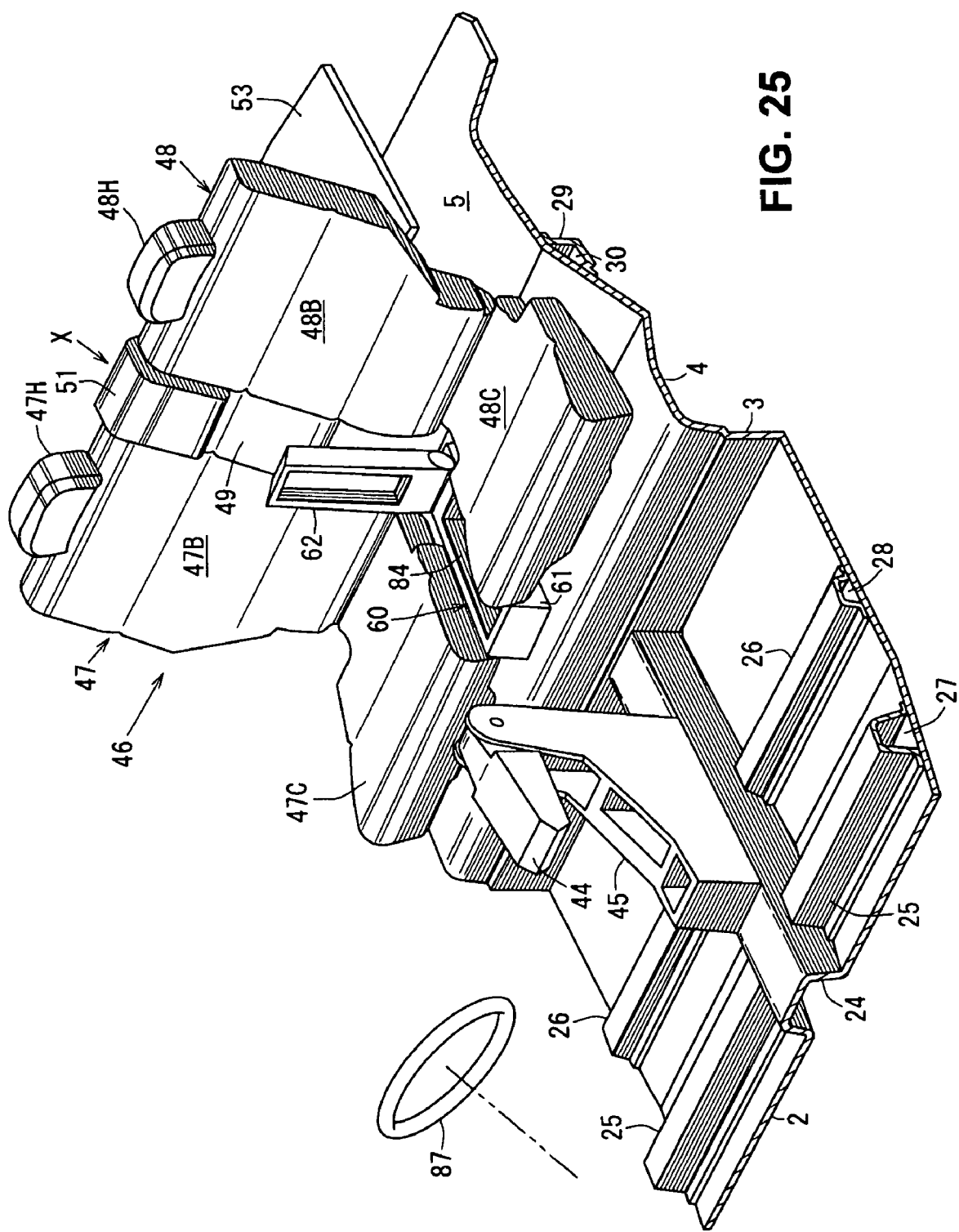
FIG. 25 is a perspective view in a state where a lid member of the center seat cushion is opened.

FIG. 25 shows a normal state of the armrest portion for rear seat 49 forming the center seat back X in which the lid member 62 of the center seat cushion 60 is opened. As shown in this figure, the storage portion 84 is provided at the center seat cushion 60, and this storage portion 84 is covered with the lid member 62.

Figure 26:
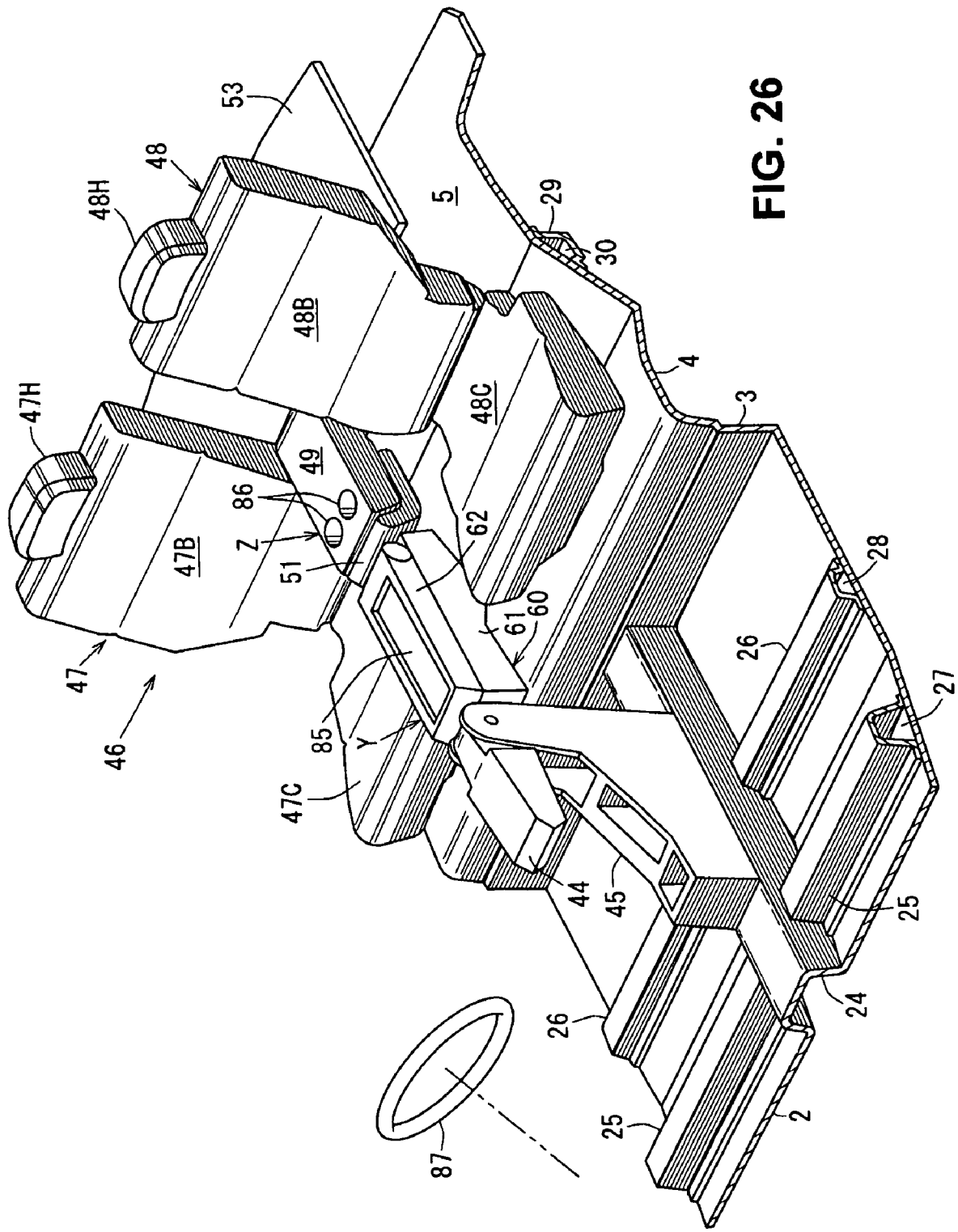
FIG. 26 is a perspective view of a console portion according to another embodiment.
Figure 27:
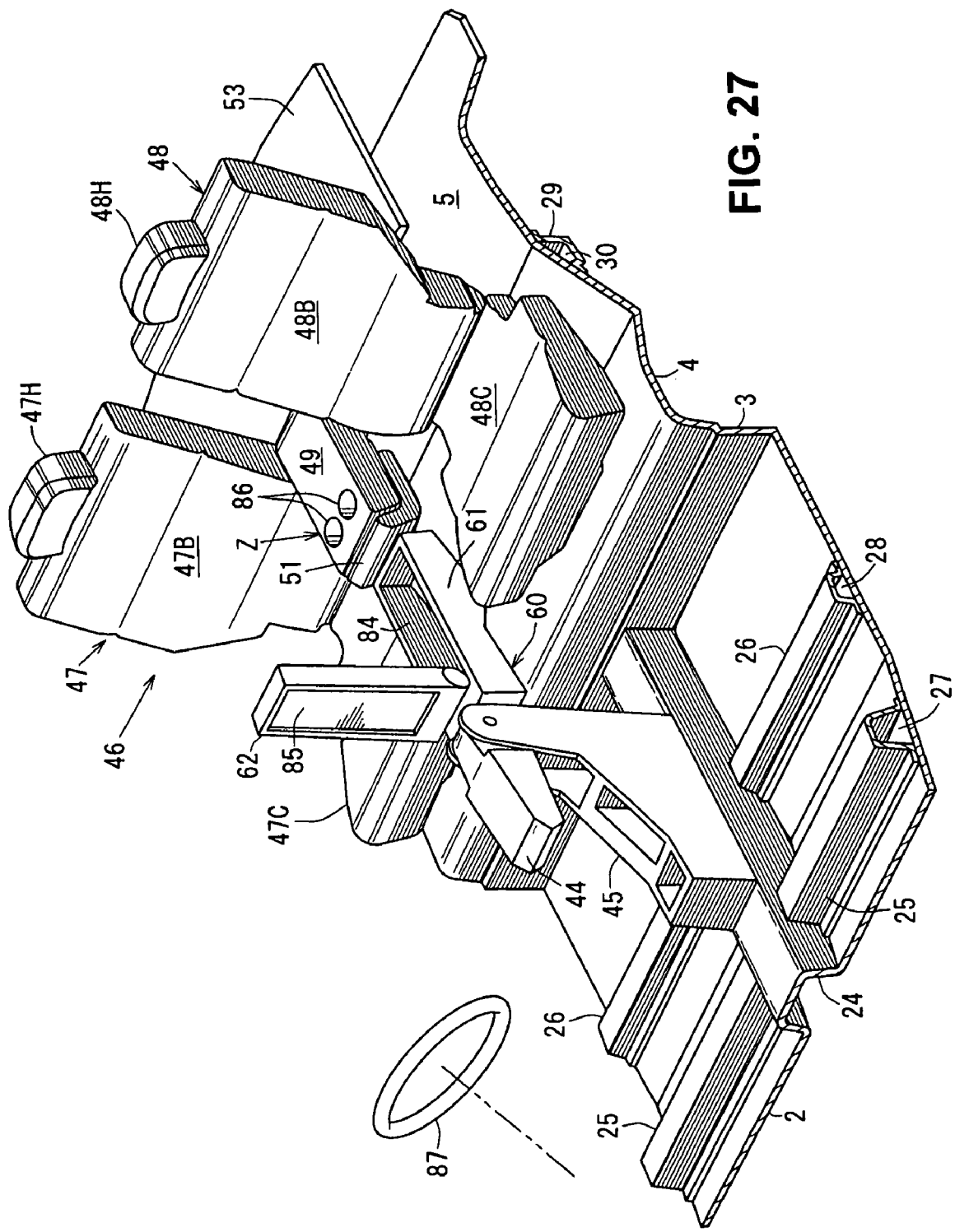
FIG. 27 is a perspective view of lid-member opening pivotal axis according to the another embodiment.

FIG. 26 shows a state where the above-described console portions Y, Z are formed by moving the center seat cushion 60 upward and forward and rotating the armrest portion 49 forward. As shown in this figure, a tray 85 is provided at the upper face of the lid member 62 of the center seat cushion 60, one or plural cup holders 86 are provided at the upper face (back face in the normal state) of the armrest portion for rear seat 49. Thus, the convenience is improved. Herein, the pivotal support point of the lid member 62 at the center seat cushion 60 may be located at a rear portion as shown in FIG. 26 or at a front portion as shown in FIG. 27. Herein, a reference numeral 87 denotes a steering wheel in the figures.

As described above, the seat device for a vehicle of the above-described embodiments comprises the rear row seat 46 including the seat cushions 47C, 48C forming the sitting face for the passenger and the seat backs 47B, 48B standing upward from the rear end portion of the seat cushions 47C, 48C and forming the leaning back face for the passenger, the armrest portion 49 provided at the central portion of the seat backs 47B, 48B of the rear row seat 46, the armrest portion 49 being operative to move forward away from the seat backs 47B, 48B for allowing an object to be placed thereon, and the center seat cushion 60 as the movable cushion portion provided at the central portion of the seat cushions 47C, 48C in the vehicle width direction, the center seat cushion 60 being operative to move upward and forward away from the seat cushions 47C, 48C to the location near the front end of the armrest portion 49.

According to the above-described structure, since the center seat cushion 60 moves upward and forward away from the seat cushions 47C, 48C to the location near the front end of the armrest portion 49, the large-scaled console Z (storage space) can be formed at the proper level with the armrest portion 49 and the center seat cushion 60, thereby improving convenience.

Also, the armrest portion 49 and center seat cushion 60 are configured so as to form the console portion Z therewith having the substantially continuous upper face. Thereby, since the continuously flat console Z can be formed, the convenience can be further improved.

Further, the pair of seat backs 47B, 48B are provided independently from each other in the vehicle width direction, the armrest portion 49 is provided between the pair of the seat backs 47B, 48B, and the armrest portion 49 is operative to form the center seat back X (see FIG. 3) in the normal state thereof.

Thereby, in case of the normal state where the armrest portion 49 is used as the center seat back X (see FIG. 3), three passengers can sit in the rear seat. While, in case where the armrest portion 49 is used as the armrest (see FIG. 4), a pair of personal seats can be provided such that two passengers can independently sit in the rear seat. Namely, two types of rear seat for two passengers and three passengers are available at needs, and the armrest portion 49 only for passengers in the rear seat can be provided in the case where the armrest portion 49 is used as the armrest. Thus, the passengers can be provided with a comfortable sitting.

Additionally, the front row seat 43 comprising the driver's seat 41 and the assistant's seat 42 is provided in front of the rear row seat 46, and the armrest portion for front seat 44 is provided between the driver's seat 41 and the assistant's seat 42.

Thereby, many passengers sitting can be provided with the front and rear row seats 43, 46. Further, when the small number of passengers sit, as shown in FIG. 23, the center seat cushion 60 of the rear row seat 46 is moved upward and forward, there can be further larger console portions Y, Z with the armrest portion for front seat 44, center seat cushion 60, and armrest portion for rear seat 49. Accordingly, the convenience can be further improved.

Also, the center seat cushion 60 is positioned substantially at the continuously close level to the armrest portion for front seat 44 when the center seat cushion 60. Thereby, the armrest portion for front seat 44, center seat cushion 60 and armrest portion for rear seat 49 are made flat, so the convenience can be further improved.

Further, the seat backs 47B, 48B of the rear row seat 46 are forward foldable such that the flat baggage compartment is formed thereon as shown in FIGS. 5 and 6. Thereby, the properly flat and large baggage compartment can be formed when the seat backs 47B, 48B of the rear row seat 46 are forward folded.

Additionally, the armrest portion for front seat 44 is supported at the floor console portion 45, which is provided on the floor panel 2 (specifically, the tunnel portion 24) between the driver's seat 41 and the assistant's seat 42, independently from both the seats.

Thereby, even if the driver's seat 41 and/or the assistant's seat 42 slide in the longitudinal direction, the position of the armrest portion for front seat 44 can be ensured, maintaining the support rigidity of the armrest portion for front seat 44, and the association of the center seat cushion 60 with the armrest portion for front seat 44 can be properly maintained.

Further, at least one of the seat backs of the rear row seat 46 is configured to move in the longitudinal direction, the armrest portion for rear seat 49 is attached to either one of the seat backs of the rear row seat 46 (the left-side seat back 48B in the present embodiment).

Thereby, the space of the baggage compartment and the passenger compartment can be properly adjusted by moving the rear row seat 46 longitudinally, forming the large-scaled console Y at the proper level with the center seat cushion 60 the armrest portion for front seat 44.

Also, a pair of seat cushions 47C, 48C are provided independently from each other in the vehicle width direction, the center seat cushion 60 is provided between the pair of the seat cushions 47C, 48C, and the center-seat-cushion moving mechanism 63 to move the center seat cushion 60 upward and forward is provided.

Thereby, the layout for many passengers sitting can be provided with the front and rear row seats 43, 46. Also, in a case where the small number of passengers sit in the vehicle, the center seat cushion 60 provided between the pair of the seat cushions 47C, 48C of the rear row seat 46 is moved forward and upward by the center-seat-cushion moving mechanism 63 such that the center seat cushion 60 is located at the proper level. Accordingly, the center seat cushion 60 can be used as the properly convenient console.

Namely, compatibility of the layout in case of many passengers and the convenient console forming in case of the small number of passengers can be attained.

Also, the storage portion 84 for an object, which is covered with the lid member 62 that can be opened and closed, is provided at the center seat cushion 60 (see FIGS. 25 and 27).

Thereby, the center seat cushion 60 can be properly used as the object storage.

Further, the center-seat-cushion moving mechanism 63 comprises the link mechanism 72 including a pair of links that are provided longitudinally.

Thereby, the center-seat-cushion moving mechanism 63 can be materialized with a simple structure.

Herein, one ends of the pair of links of the link mechanism 72 are connected to the floor panel (kick-up floor portion 4) and the other ends are connected to the center seat cushion 60.

Since the links of the link mechanism 72 are connected to the floor panel at their one ends, a properly-high support rigidity can be provided to the link mechanism 72 and center seat cushion 60.

Additionally, one of the pair of links of the link mechanism 72 is located in the recess portion 4a of the floor panel (kick-up floor portion 4) (see FIGS. 11 and 14).

Thereby, one of the pair of links of the link mechanism 72 can be stored properly by utilizing a space (dead space) formed at the floor panel (kick-up floor portion 4).

Herein, the correspondence between the structures of the present invention and the above-described embodiments are as follows: the movable cushion portion corresponds to the center seat cushion 60; the cushion moving mechanism corresponds to the center-seat-cushion moving mechanism 63; and the armrest portion corresponds to the armrest portion 49 for rear seat.

The present invention should not be limited to the above-described embodiments, and any other modifications and improvements may be applied within the scope of a sprit of the present invention.

What is claimed is:

1. A seat device for a vehicle, comprising:
 a seat cushion and a seat back of a rear row seat, the seat cushion forming a sitting face for a passenger, the seat back standing upward from a rear end portion of the seat cushion and forming a leaning back face for the passenger;
 an armrest portion of the rear row seat provided at a central portion of the seat back of the rear row seat, the armrest portion of the rear row seat being operative to move forward away from the seat back for allowing an object to be placed on an upper face thereof; and
 a movable cushion portion provided at a central portion of the seat cushion in a vehicle width direction, the movable cushion portion being operative to move upward and forward away from the seat cushion to a location near a front end of the armrest portion of the rear row seat that has moved forward, the movable cushion portion that has moved upward and forward having an upper face thereof, wherein said armrest portion of the rear row seat that has moved forward and said movable cushion portion that has moved upward and forward are configured so as to form a substantially continuous flat face with the upper faces thereof.

2. The seat device for a vehicle of claim 1, wherein the seat back of the rear row seat comprises a pair of seat backs that are provided independently from each other in the vehicle width direction, the armrest portion of the rear row seat is provided between the pair of the seat backs, and the armrest portion of the rear row seat is operative to form a center seat back in a normal state thereof.

3. The seat device for a vehicle of claim 1, wherein a front row seat comprising a driver's seat and an assistant's seat is provided in front of the rear row seat, and an armrest portion of the front row seat is provided between the driver's seat and the assistant's seat.

4. The seat device for a vehicle of claim 3, wherein the movable cushion portion is positioned substantially at a continuously close level to the armrest portion of the rear row seat when the movable cushion portion has moved upward and forward.

5. The seat device for a vehicle of claim 1, wherein the seat back of the rear row seat is forward foldable such that a flat baggage compartment is formed thereon.

6. The seat device for a vehicle of claim 3, wherein the armrest portion of the front row seat is supported at a floor console portion, which is provided on a floor panel between the driver's seat and the assistant's seat, independently from both the seats.

7. The seat device for a vehicle of claim 2, wherein at least one of the seat backs of the rear row seat is configured to move in a longitudinal direction, the armrest portion of the rear row seat is attached to either one of the seat backs of the rear row seat.

8. The seat device for a vehicle of claim 1, wherein the seat cushion of the rear row seat comprises a pair of seat cushions that are provided independently from each other in the vehicle width direction, the movable cushion portion is provided between the pair of the seat cushions, and a cushion moving mechanism to move the movable cushion portion upward and forward is provided.

9. The seat device for a vehicle of claim 1, wherein a storage portion for an object, which is covered with a lid member that can be opened and closed, is provided at the movable cushion portion.

10. A seat device for a vehicle, comprising:

a seat cushion and a seat back of a rear row seat the seat cushion forming a sitting face for a passenger, the seat back standing upward from a rear end portion of the seat cushion and forming a leaning back face for the passenger;

an armrest portion provided at a central portion of the seat back of the rear row seat, the armrest portion being operative to move forward away from the seat back for allowing an object to be placed thereon; and a movable cushion portion provided at a central portion of the seat cushion in a vehicle width direction, the movable cushion portion being operative to move upward and forward away from the seat cushion to a location near a front end of the armrest portion, wherein the seat cushion of the rear row seat comprises a pair of seat cushions that are provided independently from each other in the vehicle width direction, the movable cushion portion is provided between the pair of the seat cushions, and a cushion moving mechanism to move the movable cushion portion upward and forward is provided, the cushion moving mechanism comprising a link mechanism having a pair of links that are provided longitudinally.

11. The seat device for a vehicle of claim 10, wherein one ends of the pair of links are connected to a floor panel and the other ends are connected to the movable cushion portion.

12. The seat device for a vehicle of claim 10, wherein at least one of the pair of links is located in a recess portion of the floor panel.

13. A seat device for a vehicle, comprising:

a front row seat including a driver's seat and an assistant's seat, each of the driver's seat and assistant's seat having a seat cushion and a seat back;

a rear row seat including a pair of rear seats, each of the rear seats having a seat cushion and a seat back;

an armrest portion of the front row seat provided between said driver's seat and said assistant's seat;

an armrest portion of the rear row seat provided between both seat backs of said rear seats, the armrest portion of the rear row seat being operative to move forward away from the seat backs of the rear seats for allowing an object to be placed on an upper face thereof;

a movable cushion portion provided between both seat cushions of said rear seats, the movable cushion portion being operative to move upward and forward away from the seat cushions of the rear seats, the movable cushion portion that has moved upward and forward having an upper face thereof, wherein said armrest portion of the rear row seat that has moved forward and said movable cushion portion that has moved upward and forward are configured so as to form a substantially continuous flat face with the upper faces thereof.

14. The seat device for a vehicle of claim 13, wherein said movable cushion portion that has moved upward and forward is positioned substantially at a continuously close level to said armrest portion of the front row seat, whereby the armrest portion of the front row seat, movable cushion portion, and armrest portion of the rear row seat can form substantially a continuous console portion thereon.

* * * * *